United States Patent
Hato et al.

(10) Patent No.: US 7,756,146 B2
(45) Date of Patent: Jul. 13, 2010

(54) FLOODING REDUCTION METHOD

(75) Inventors: Kunio Hato, Tokyo (JP); Muneyoshi Suzuki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 898 days.

(21) Appl. No.: 11/578,809

(22) PCT Filed: Jan. 31, 2006

(86) PCT No.: PCT/JP2006/301512
§ 371 (c)(1),
(2), (4) Date: Oct. 18, 2006

(87) PCT Pub. No.: WO2006/095508
PCT Pub. Date: Sep. 14, 2006

(65) Prior Publication Data
US 2009/0109848 A1     Apr. 30, 2009

(30) Foreign Application Priority Data
Mar. 8, 2005    (JP)  .............................. 2005-063534

(51) Int. Cl.
*H04L 12/28* (2006.01)
*H04L 12/56* (2006.01)
(52) U.S. Cl. .................. 370/401; 370/395.53; 370/404; 370/407; 709/245
(58) Field of Classification Search .................. 370/404, 370/407, 401, 395.53, 419, 461, 463; 709/245
See application file for complete search history.

(56) References Cited

U.S. PATENT DOCUMENTS 5,060,228 A * 10/1991 Tsutsui et al. ................ 370/402

(Continued)

FOREIGN PATENT DOCUMENTS

JP      2003-324468      11/2003

(Continued)

OTHER PUBLICATIONS

IEEE Standard 802.1ad "Virtual Bridged Local Area Networks Amendment 4: Provider Bridges"; May 26, 2006.*

(Continued)

*Primary Examiner*—Aung S Moe
*Assistant Examiner*—Benjamin Elliott
(74) *Attorney, Agent, or Firm*—Carrier, Blackman & Associates P.C.; Joseph P. Carrier; William D. Blackman

(57) ABSTRACT

In receiving a MAC (media access control) frame whose destination address is any of a broadcast address, an unknown multicast address and an unknown unicast address, the flooding is reduced by broadcasting the received MAC frame to all the other ports than one that has received the MAC frame. An output control that attains this object is realized by using a destination group identifier (ID) look-up table (2-T1) which enables a look-up of a destination group ID by using, as a key, any one or combination of header information of the MAC frame, a port which received the MAC frame and a service VLAN (virtual local area network) ID corresponding to the MAC frame and a backbone port look-up table (2-T2) which enables a look-up of at least one backbone port which is to transmit or at least one backbone port which is not to transmit by using the destination group ID as a key.

36 Claims, 11 Drawing Sheets

U.S. PATENT DOCUMENTS

| | | | | |
|---|---|---|---|---|
| 5,491,694 | A * | 2/1996 | Oliver et al. | 370/455 |
| 5,541,922 | A * | 7/1996 | Pyhalammi | 370/462 |
| 5,757,795 | A * | 5/1998 | Schnell | 370/392 |
| 5,825,772 | A * | 10/1998 | Dobbins et al. | 370/396 |
| 5,832,236 | A * | 11/1998 | Lee | 709/249 |
| 5,892,912 | A * | 4/1999 | Suzuki et al. | 370/395.53 |
| 6,041,166 | A * | 3/2000 | Hart et al. | 709/238 |
| 6,044,081 | A * | 3/2000 | Bell et al. | 370/401 |
| 6,101,188 | A * | 8/2000 | Sekine et al. | 370/401 |
| 6,747,979 | B1 * | 6/2004 | Banks et al. | 370/401 |
| 6,999,418 | B2 * | 2/2006 | Sharma et al. | 370/230 |
| 7,116,672 | B1 * | 10/2006 | Sivakumar | 370/395.4 |
| 7,339,929 | B2 * | 3/2008 | Zelig et al. | 370/390 |
| 7,436,784 | B2 * | 10/2008 | Hashimoto | 370/258 |
| 7,469,298 | B2 * | 12/2008 | Kitada et al. | 709/236 |
| 2006/0248227 | A1 * | 11/2006 | Hato et al. | 709/245 |
| 2009/0109848 | A1 * | 4/2009 | Hato et al. | 370/235 |

FOREIGN PATENT DOCUMENTS

| | | |
|---|---|---|
| JP | 2004-304669 | 10/2004 |

OTHER PUBLICATIONS

Kunio Hato et al., "Gaves ni okeru MAC-in-MAC Hoshiki to VLAN Kakucho Hoshiki no Hikaku", 2004 Nen The Institute of Electronics, Information and Communication Engineers Sogo Taikai Koen Ronbunshu B-7-65, Mar. 8, 2004, full text; all drawings.

Kunio Hato et al., "Gaves ni okeru Flooding Yokusei Hoho no Kento", 2005 Nen IEICE Communications Society Congerence Koen Ronbunshu B-7-58, Sep. 7, 2005, full text; all drawings.

* cited by examiner

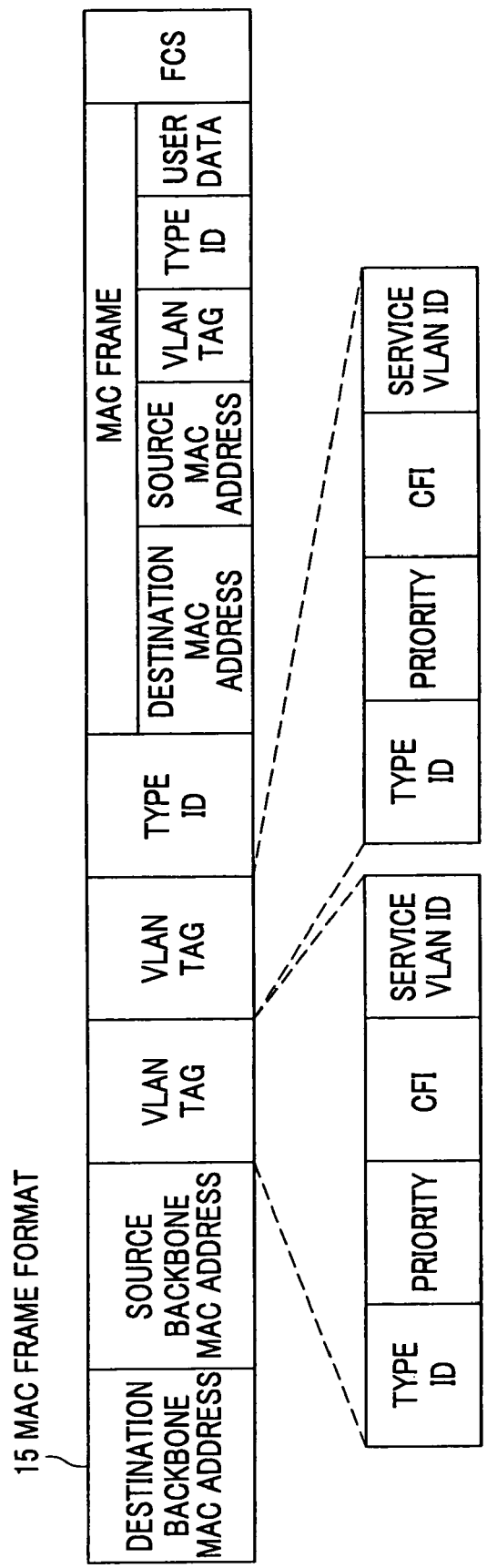

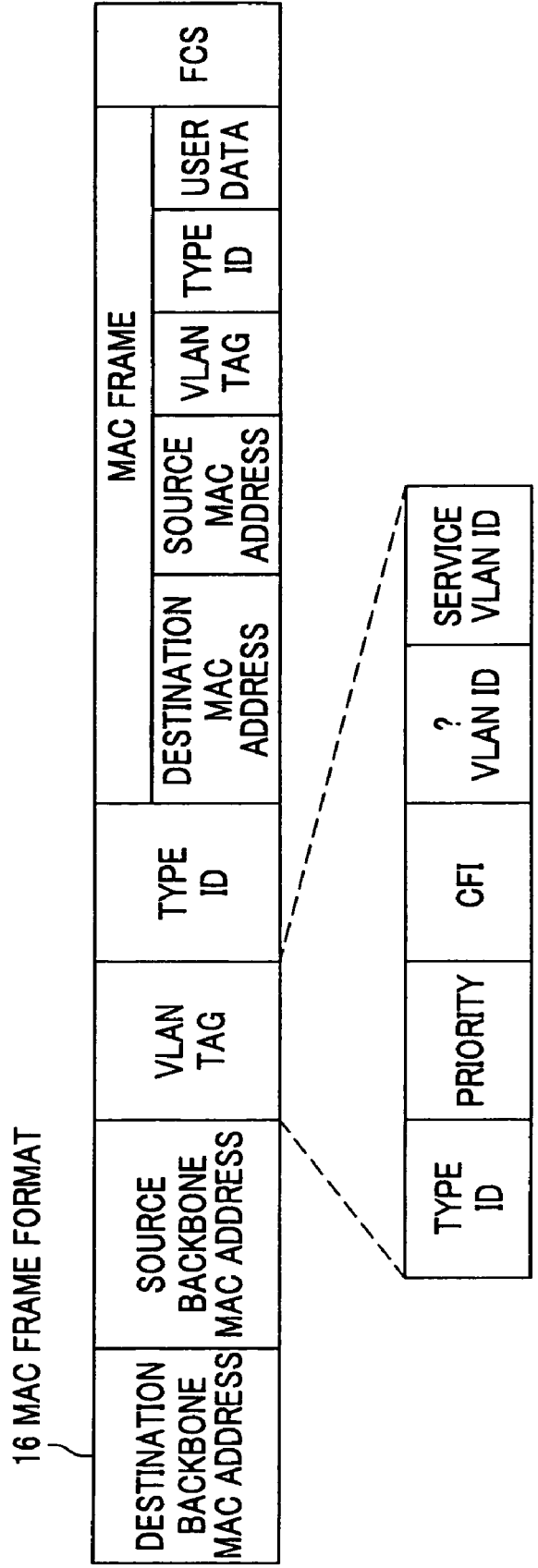

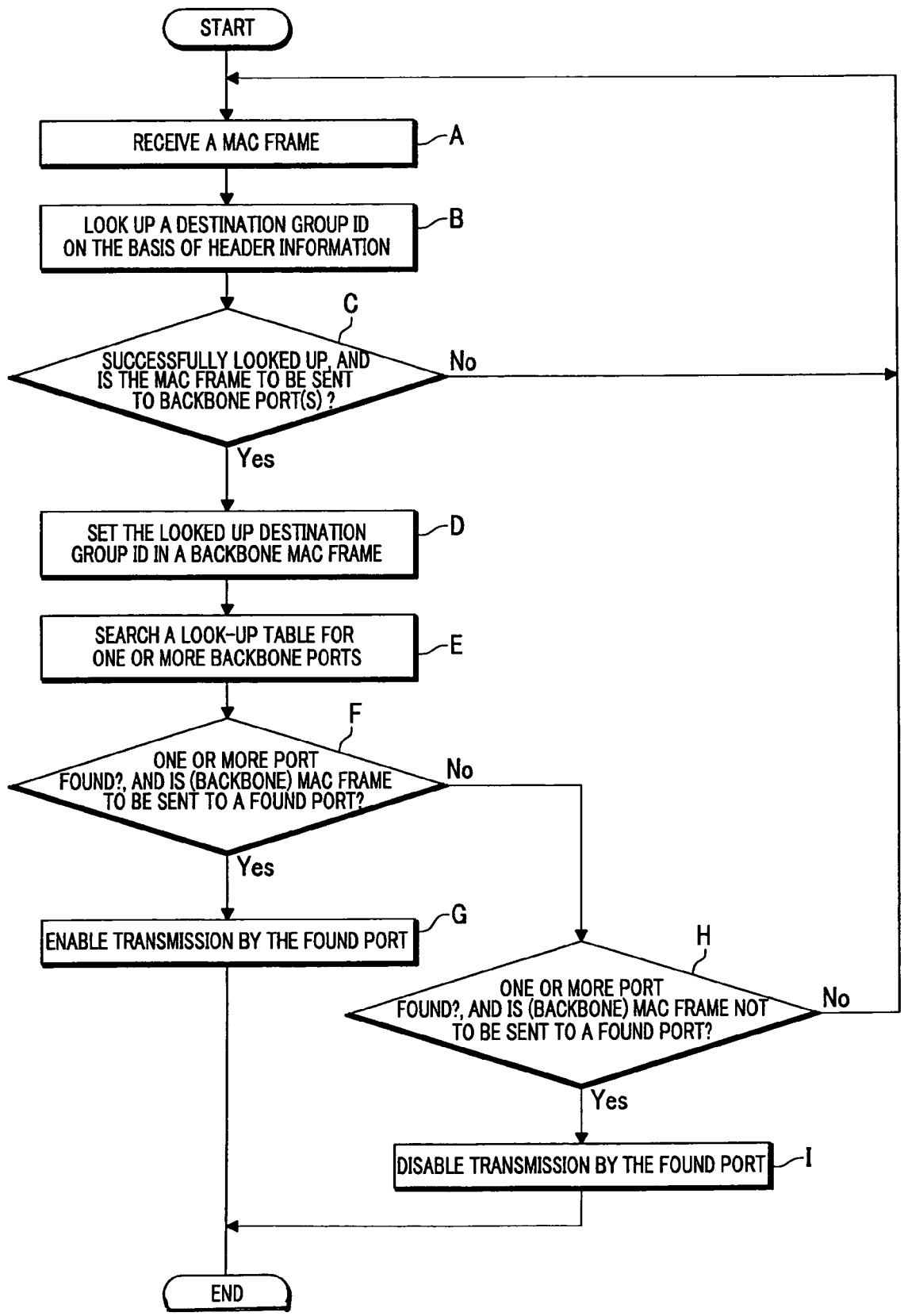

FLOODING REDUCTION METHOD

The present invention relates to a method of reducing the flooding of customer frames in a transfer route in a virtual local area network (VLAN) service provided by a provider for customers.

BACKGROUND ART

If a bridge receives, in a network provided through bridges, a MAC (media access control) frame whose destination address is a broadcast address, an unknown multicast address or an unknown unicast address, then the bridge broadcasts (or simultaneously sends) the MAC frame to all of the other ports than the port that has received the MAC frame This disadvantageously increase a probability that terminals connected to the network will receive MAC frames unnecessary for the terminals to receive, which causes a problem that links interconnecting the bridges may have their bands compressed due to the unnecessary MAC frames.

Similarly, if a bridge receives a MAC frame which belongs to an unknown VLAN and which has, as the destination address, a broadcast address, an unknown multicast address or an unknown unicast address, then the bridge broadcasts the MAC frame to all of the other ports than the port that has received the MAC frame.

In a network provided through conventional bridges, the above-mentioned problem can be settled by the generic attribute registration protocol (GARP) provided in IEEE standard 802.1D, the IGMP (Internet Group Management Protocol) snooping, or similar protocols.

In the GARP, exchanging attributes with the neighboring bridges enables knowing a neighboring bridge to which a received MAC frame which has a specific multicast address as the destination address or which belongs to a known VLAN should be transferred, which results in unnecessary MAC frames not being sent to any other neighboring bridges. However, this method is disadvantageous in that each of the bridges on the routes has to have a control protocol for this installed and has to exchange information with each other.

Also, in the IGMP snooping, a bridge which is not a supposed recipient snoops into multicast routing information exchanged in an upper layer and knows the direction in which a MAC frame with a specific multicast address should be transferred.

However, this method is disadvantageous in that it is difficult to implement this method in bridges in which a higher-speed transfer is required because a process of snooping into the routing information exchanged in an upper layer is a heavy load to such bridges. Also, it is another problem that a satisfactory effect can not be expected unless all of the bridges on the routes participate in this method as in case of the GARP.

Due to the above-mentioned disadvantages and problems, in the current situation, it is hard to say that such methods as the GARP and the IGMP snooping are widely used as the flooding reduction technique in a network provided through bridges. In particular, there has not been found, among other things, a case in which either of these methods is used in a provider's network which serves a lot of customers and requires higher-speed transfers. The problem of flooding reduction in a bridge-based network becomes more serious in a VLAN (virtual LAN) service provided by a provider for the customers.

If any setting for flood reduction is installed in the bridges on the routes, there will be required the processes of making tests of plural locations of the header of each customer MAC frame and deciding whether to do a control on the basis of a comparison with the setting in order to reduce the flooding according to the setting. Pursuing the flood reduction in a provider's networks, which have to maintain and process the setting information in a logically separated manner in order to serve many customers, will cause trade-off problems that the transfer process itself becomes a heavy load due to, for example, making tests of the customer's VLAN information which would not be usually made while higher-speed transfers are required.

Also, if no flooding reduction measures are taken, unnecessary flooding MAC frames have to be transferred in the edge bridges and the backbone bridges, disadvantageously affecting the other customers' transfer processes. Further, since customer or subscriber lines are generally narrower in the band as compared with backbone lines or customer's premise networks and the band width varies drastically depending on the customer's locations, if flooding of MAC frames occurred in a location of a broader band flows into a location of a narrower band, the communications of the narrower-band location will be disturbed due to unnecessary traffics.

For the above-described reasons, providers have to reduce the flooding of customer frames which pass through the providers' networks without using the GARP, the IGMP snooping or similar protocols and to reduce unnecessary traffics.

The inventors of the present invention have been engaged in the study to solve the above-mentioned various problems in the prior art and have achieved the invention in the course of the study.

Non-patent-related document 1: IEEE Std. 802.1D (for the GARP)

Non-patent-related document 2: RFC2236 IGMP Version 2

DISCLOSURE OF INVENTION

According to an aspect of the invention, there is provided a MAC (media access control) frame transfer method for reducing a flooding in a backbone network with which a plurality of customer local area networks are connected via respective edge bridges which each comprise at least one customer port and at least one backbone port to realize a VLAN (virtual local area network). The method comprising the steps of receiving a MAC frame from one of the customer local area networks via the at least one customer port of each edge bridge; identifying a service VLAN ID for the MAC frame from a customer port which received the MAC frame; obtaining a destination group ID for identifying a combination of a source of the MAC frame and at least one destination; on the basis of the obtained destination group ID, judging whether the at least one backbone port includes one which is to transfer the MAC frame; if the at least one backbone port includes at least one backbone port which is to transfer the MAC frame, forming a backbone MAC frame which includes the MAC frame and the service VLAN ID; setting the destination group ID in the backbone MAC frame; and transferring the backbone MAC frame with the destination group ID set to the at least one backbone port which is to transfer the MAC frame.

In one embodiment of the invention, the MAC frame transfer method further comprises the steps of judging whether the at least one customer port includes at least one customer port which is other than one that has received the MAC frame and corresponds to the identified service VLAN ID; and if the at least one customer port includes at least one customer port which is other than one that has received the MAC frame and corresponds to the identified service VLAN ID, then transferring the MAC frame to the included at least one customer port.

The MAC frame transfer method may further comprise the steps of receiving the backbone MAC frame from the backbone network via the at least one backbone port of one of the edge bridges; identifying the destination group ID of the backbone MAC frame; on the basis of the identified destination group ID, judging whether the at least one backbone port includes at least one backbone port which is other than one that has received the backbone MAC frame and which the backbone MAC frame is to be transferred to; and if the included at least one backbone port exists, transferring the backbone MAC frame to the included at least one backbone port.

The MAC frame transfer method may further comprise the steps of receiving the backbone MAC frame from the backbone network via the at least one backbone port of each edge bridge; judging whether the at least one customer port includes at least one customer port that corresponds to the service VLAN ID of the received backbone MAC frame; and if the included at least one customer port exists, extracting the MAC frame from the received backbone MAC frame and transferring the extracted MAC frame to the included at least one backbone port.

In another embodiment of the invention, the MAC frame transfer method further comprises the step of setting a destination group ID look-up table in which at least one of at least a part of header information of the MAC frame, the customer port which received the MAC frame and the service VLAN ID for the MAC frame is recorded in association with the destination group ID so as to enable searching and alteration thereof. The step of obtaining a destination group ID includes the step of searching the destination group ID look-up table.

The MAC frame transfer method may further comprise the step of setting a backbone port look-up table in which each destination group ID is recorded in association with at least one backbone port and information on whether each of the at least one backbone port is capable of relaying the backbone MAC frame corresponding to the destination group ID so as to enable searching and alteration thereof. The step of judging on the basis of said obtained destination group ID and the step of judging on the basis of said identified destination group ID may include the step of searching the backbone port look-up table.

In till another embodiment of the invention, the MAC frame transfer method further comprises the step of, if the step of obtaining a destination group ID fails in obtaining the destination group ID, discarding the MAC frame. The MAC frame transfer method may further comprises the step of, if user data is not encapsulated in the received MAC frame, discarding the MAC frame.

The backbone MAC frame may include a destination address, and the step of transferring said backbone MAC frame may comprise the step of setting the destination group ID as the destination address of the backbone MAC frame. The backbone MAC frame may include a transfer-use VLAN ID for the MAC frame, and the step of transferring said backbone MAC frame may comprise the step of setting the destination group ID as the transfer-use VLAN ID. The step of transferring said backbone MAC frame may comprise the step of setting the destination group ID as the service VLAN ID of the backbone MAC frame.

In further embodiment of the invention, the MAC frame transfer method further comprises the steps of receiving the backbone MAC frame from the backbone network via one of a plurality of backbone ports of one of the edge bridges; identifying the destination group ID of the backbone MAC frame; on the basis of the identified destination group ID, judging whether the plurality of backbone ports include at least one backbone port which is other than one that has received the backbone MAC frame and is capable of relaying the backbone MAC frame; and if the included at least one backbone port exists, transferring the backbone MAC frame to the included at least one backbone port.

In another embodiment of the invention, the MAC frame transfer method further comprises the steps of finding at least one route through which the backbone MAC frame should be transferred to at least one destination identified by the destination group ID on the basis of topology information indicative of a physical connection pattern of nodes comprised of all the edge bridges and backbone bridges connected with the backbone network and backbone ports interconnecting the nodes, and outputting edge bridges, backbone bridges and backbone ports used for transfers through the at least one route. The judging may be based on the output edge bridges, backbone bridges and backbone ports in the step of judging on the basis of said obtained destination group ID or the step of judging on the basis of said identified destination group ID.

The MAC frame transfer method may further comprise the step of setting a backbone port look-up table in which each destination group ID is recorded in association with at least one backbone port and information on whether each of the at least one backbone port is capable of relaying the backbone MAC frame corresponding to the destination group ID so as to enable searching and alteration thereof. In this case, the step of judging on the basis of said identified destination group ID includes the step of searching the backbone port look-up table by using the identified destination group ID.

The MAC frame transfer method may further comprise the steps of finding at least one route through which the backbone MAC frame should be transferred to at least one destination identified by the destination group ID on the basis of topology information which indicates, for a given destination group ID, a physical connection pattern of nodes comprised of all the edge bridges and backbone bridges connected with the backbone network and backbone ports interconnecting the nodes; outputting edge bridges, backbone bridges and backbone ports used for transfers through the at least one route; and updating the backbone port look-up table with the output edge bridges, backbone bridges and backbone ports.

In still another embodiment of the invention, the MAC frame transfer method further comprises the steps of setting a destination routing information table in which a set of a source and at least one destination of each MAC frame is recorded in association with a corresponding destination group ID so as to enable searching and alteration thereof, permitting a network administrator to input a set of destinations; if a destination group ID corresponding to the set of destinations is found in a search of the destination routing information table, outputting the found destination group ID; if the destination group ID corresponding to the set of destinations is not found in the search, assigning an unused destination group ID, registering the assigned destination group ID in the destination routing information table, and outputting the assigned destination group ID; on die basis of the destination routing information table which includes the assigned destination group ID, updating the destination group ID look-up table included in each of at least one of the edge bridges which at least one is a destination of the backbone MAC frame with the destination group ID set.

The MAC frame transfer method may further comprise the steps of setting a topology information table which contains topology information indicative of a physical connection pattern of nodes comprised of all the edge bridges and backbone bridges connected with the backbone network and backbone ports interconnecting the nodes so as to enable searching and alteration; in each edge bridge, setting a backbone port look-up table in which each destination group ID is recorded in association with at least one backbone port and information on whether each of the at least one backbone port is capable of relaying the backbone MAC frame corresponding to the destination group ID so as to enable searching and alteration thereof, in each backbone bridge, setting a backbone port look-up table in which each destination group ID is recorded in association with at least one backbone port and information on whether each of the at least one backbone port is capable of relaying the backbone MAC frame corresponding to the destination group ID so as to enable searching and alteration thereof, setting a backbone routing information table in which a given destination group ID is recorded in association with a set of edge bridges, backbone bridges and backbone ports witch are used for transferring a backbone MAC frame with the given destination group ID so as to enable searching and alteration thereof; if a new destination group ID is registered in the backbone routing information table, finding, on the basis of the topology information table, at least one route through which a backbone MAC frame with the assigned destination group ID is transferred to at least one destination identified by the new destination group ID and outputting edge bridges, backbone bridges and backbone ports which are used for transferring the backbone MAC frame; updating the backbone routing information table by registering a set of the assigned destination group ID and the output edge bridges, backbone bridges and backbone ports; and if the backbone routing information table is updated with assigned destination group ID, updating, on the basis of the updated backbone routing information table, each of the backbone port look-up tables included in at least one of edge bridges and backbone bridges which at least one constitutes a route for transferring the backbone MAC frame with the assigned destination group ID.

According to another aspect of the invention, there is provided an edge bridge for connecting a customer LAN (local area network) to a backbone network so that customer LANs constitute a virtual LAN (VLAN). The edge bridge comprises at least one customer port for each communicating a MAC (media access control) frame with the customer LAN; a destination group ID look-up table in which at least one of at least a part of header information of the MAC frame, a customer port which received the MAC frame and a service VLAN ID for the MAC frame is recorded in association with a destination group ID for identifying a combination of a source of the MAC frame and at least one destination of the MAC frame so as to enable searching and alteration thereof, a backbone port look-up table in which each destination group ID is recorded in association with at least one backbone port and information on whether each of the at least one backbone port is capable of relaying the backbone MAC frame corresponding to the destination group ID so as to enable searching and alteration thereof, a destination group ID look-up module, operative in case of receiving the MAC frame from one of the at least one customer port, for looking up a destination group ID in the destination group ID look-up table by using as the key at least one or any combination of at least a part of the header information of the MAC frame, a customer port which received the MAC frame and a service VLAN ID corresponding to the MAC frame; a backbone port look-up module, response to a finding of the destination group ID by the destination group ID look-up module, for searching, with the destination group ID, the backbone port look-up table for one or more of the at least one backbone port which is to transfer the MAC frame; transmission control module, operative in the event that the one or more backbone ports which is to transfer the MAC frame are found in the at least one backbone port by the backbone port look-up module, for making the one or more backbone ports in a transmission-enable state and making remaining backbone ports in a transmission-disable state; a MAC relay portion for identifying a service VLAN ID corresponding to the MAC frame from the customer port which received the MAC frame, forming a backbone MAC frame which at least includes the MAC frame and the service VLAN ID, and transferring the backbone MAC frame to the one or more backbone ports found by the backbone port look-up module; and a destination group ID setting module for setting the destination group ID looked up by the destination group ID look-up module to the backbone MAC frame to be transferred to the one or more backbone ports by the MAC relay portion.

According to still another aspect of the invention, there is provided a system for reducing the flooding, in the backbone network, of a virtual LAN realized by connecting a plurality of customer LAN's with the backbone network via respective edge bridges as each described in the just above paragraph.

In one embodiment of the invention, the system further comprises at least one backbone bridge which has at least two backbone ports which connect with at least two of the edge bridges and other bridges. Each of the at least one backbone bridge comprises a destination group ID extracting module for extracting the destination group ID of a backbone MAC frame received via one of the at least two backbone ports of the backbone bridge from the backbone network; a backbone port look-up table in which each destination group ID is recorded in association with at least one backbone port and information on whether each of the at least one backbone port is capable of relaying the backbone MAC frame corresponding to the destination group ID so as to enable searching and alteration thereof; a backbone port look-up module for searching, with the destination group ID extracted by the destination group ID extracting module, the backbone port look-up table for one or more backbone ports of the at least two backbone ports which are not a recipient of the backbone MAC frame and which the backbone MAC frame should be transferred through; a transmission control module, operative in the event that the one or more backbone ports which the backbone MAC frame should be transferred through are found by the backbone port look-up module, for making the one or more backbone ports in a transmission-enable state and making remaining backbone ports in a transmission-disable state; and a MAC relay portion, for transferring the backbone MAC frame to the one or more backbone ports looked up by the backbone port look-up module.

The system may further comprise an operation device with a function of enabling an input and output by a network administrator to input. The operation device comprises a destination routing information table in which a combination of a source of the MAC frame and at least one destination is recorded in association with the destination group ID so as to enable searching and updating thereof, a destination routing information table look-up module for searching the destination routing information table with a set of destinations input by the network administrator; a destination group ID registering and outputting module which, if the destination group ID for the set of destinations is found by the destination routing information table look-up module, outputs the found destination group ID and, otherwise, assigning an unused destination group ID to the set of destinations, registering the assigned destination group ID in the destination routing information table, and outputs the assigned destination group ID; a destination group ID updating module for updating, on the basis of the destination routing information table which includes the assigned destination group ID, the destination group ID look-up table(s) included in at least one of all the edge bridges which at least one edge bridge is a destination of a backbone MAC frame with the destination group ID; a topology information table which retains, for each destination group ID, topology information indicative of both a physical connection pattern of nodes comprised of all the edge bridges and all the backbone bridges connected with the backbone network and backbone ports interconnecting the nodes so as to enable searching and updating thereof; a route calculator, operative in the event that the destination group ID registering and outputting module registers the unused destination group ID in the destination routing information table, for searching the topology information table for at least one route through which a backbone MAC frame with the assigned destination group ID is transferred to at least one destination identified by the assigned destination group ID and outputting edge bridges, backbone bridges and backbone ports which are used for the transfer process; a backbone routing information table for registering a given destination group ID therein, so as to enable searching and updating, in association with a set of the edge bridges and the backbone bridges used for transferring a backbone MAC frame with the destination group ID and backbone ports of the bridges; a backbone routing information table updating module for updating the backbone routing information table by registering the assigned destination group ID and the set of output edge bridges, backbone bridges and backbone ports; and a backbone port look-up table updating module, operative in the event that the backbone routing information table updating module updates the backbone routing information table with the assigned destination group ID, for updating, based on the updated backbone routing information table, information of each backbone port on whether the backbone port is capable of relaying a backbone MAC frame corresponding to the assigned destination group ID in each of backbone port look-up tables included in edge bridges and backbone bridges which are used as transfer routes for a backbone MAC frame with the assigned destination group ID.

BRIEF DESCRIPTION OF DRAWINGS

FIGS. 7 through 10 are format diagrams for the first through fourth examples, respectively, of a backbone MAC frame received and transmitted at a backbone port of the edge bridge and the backbone bridge to which the flooding reduction method according to the first or the second embodiment of the invention is applied; and FIG. 11 is a flowchart showing an operational overview of the flooding reduction method according to the first embodiment of the invention.

BEST MODE FOR CARRYING OUT THE INVENTION

Figure 1:
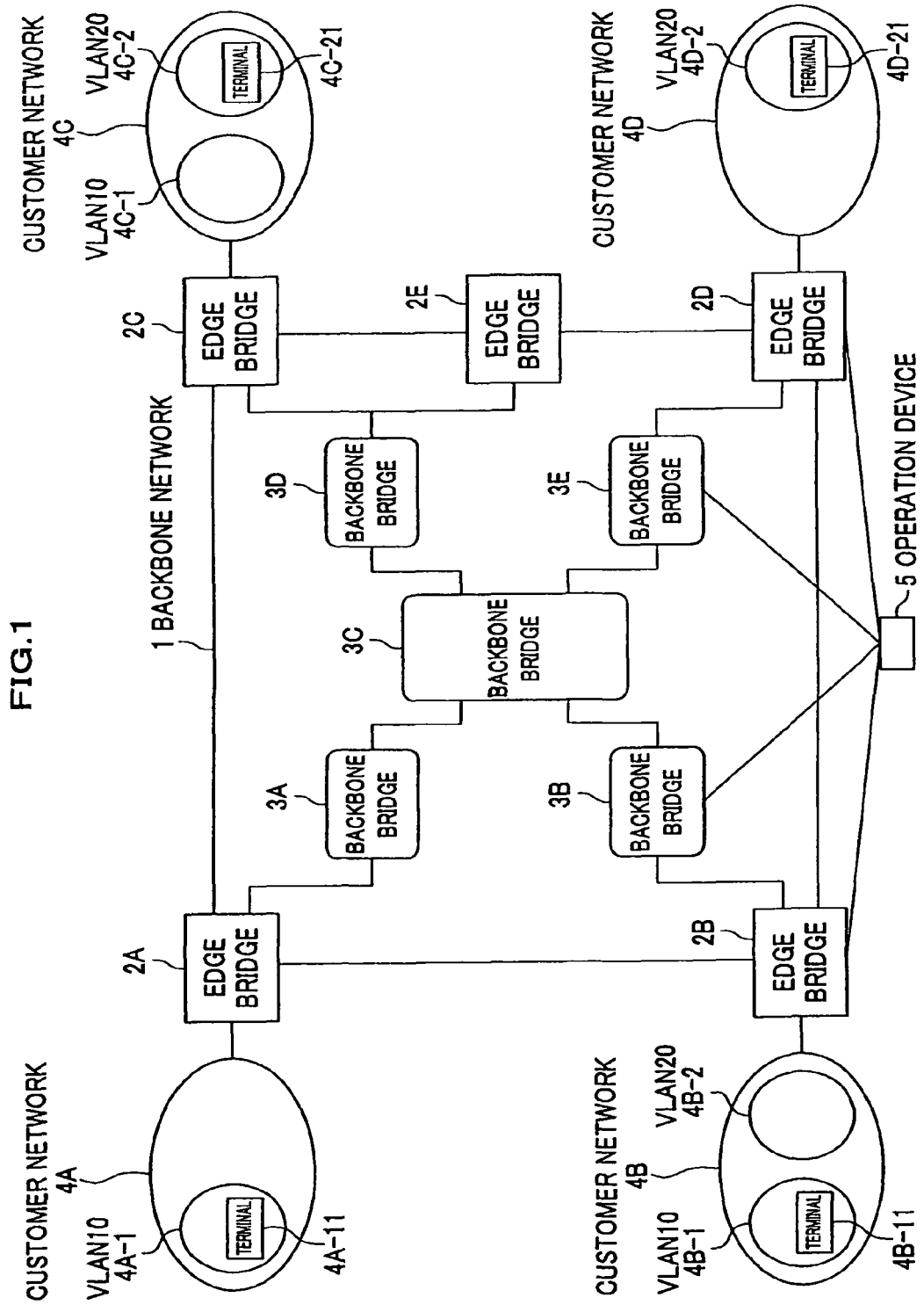
FIG. 1 is a block diagram showing an exemplary configuration of a network to which a flooding reduction method according to a first embodiment of the invention is applied.

Referring to the drawings, some embodiments of the invention will be detailed in the following.

A flooding reduction method according to a first embodiment of the invention is the most mainly characterized in that an edge bridge 2 comprises a destination group identifier (ID) look-up (or retrieval) table 2-T1 which enables the looking up of a destination group ID using, as a key, at least one or any combination of a part or the entirety of header information of a MAC frame, a port which has received the MAC frame and a service VLAN identifier corresponding to the MAC frame; and a backbone port look-up table 2-T2 which enables the looking up of one or more backbone ports 2-B which transmit or do not transmit by using the destination group ID as a key, and in that, as shown in a flowchart of FIG. 11, the edge bridge 2 executes a step B of, when receiving a MAC frame from a customer port 2-C (in step A), looking up a destination group ID in the destination group ID look-up table 2-T1 by using as the key at least one or any combination of the header information of the MAC frame, an identifier of a port which has received the MAC frame and a service VLAN identifier corresponding to the MAC frame; a step D of, if any destination group ID is found in the destination group ID look-up step and the MAC frame is transferred to one or more backbone ports 2-B by a MAC relay portion 2A-R (in case of YES in step Q, setting the looked-up destination group ID to a predetermined field in a backbone MAC frame which includes the service VLAN ID corresponding to the MAC frame; a step E of looking up a backbone port in the backbone port look-up table 2-T2 by using the destination group ID as the key, a step (F and G) of, if one or more backbone ports which are to transmit are found in the backbone port look-up step, enabling a transmission of the backbone MAC frame to the found backbone port(s); and a step (H and I) of, if one or more backbone ports which are not to transmit are found in the backbone port look-up step, disabling a transmission of the backbone MAC frame to the found backbone port(s).

The flooding reduction method, in the edge bridge, according to the first embodiment of the invention will be described more specifically. A virtual local area network (VLAN) is realized by connecting a plurality of customer LAN to a backbone network through a plurality of edge bridges. The bridges that constitute the backbone network comprise edge bridges connected to customer sites and backbone bridges which are not directly connected to the customer sites and which provide transfer routes among edge bridges in the backbone network. Each edge bridge comprises one or more customer ports connected to customer sites to each communicate a MAC frame with each customer site and one or more backbone ports connected to the backbone network to each communicate a backbone MAC frame with the backbone network. To each of the customer ports, one or more corresponding service VLAN ID's are assigned in advance. This makes it possible to relate a MAC frame received through a certain customer port to a service VLAN ID corresponding to the customer port. Thus, if a MAC frame is received through a customer port, this leads to an identification of the service VLAN ID corresponding to the MAC frame from the customer port. The backbone MAC frame at least includes a MAC frame, a service VLAN ID corresponding to the MAC frame, a source address corresponding to a source in the backbone network and a destination address corresponding to a destination.

The edge bridge has a MAC relay portion which transfers a MAC frame or a backbone MAC frame received through each port according to predetermined conditions. If user data is encapsulated in a MAC frame received through a customer port in the edge bridge, the MAC frame is transferred to the MAC relay portion, which in turn executes the following transfer processes. (1) If there exist one or more customer ports other than the recipient of the MAC frame which customer ports correspond to the service VLAN ID corresponding to the MAC frame, then the MAC frame is transferred to the one or more customer ports (the first relay process); and (2) if there exist one or more backbone ports which are to transfer a backbone MAC frame which contains the MAC frame and the service VLAN ID corresponding to the MAC frame, then the MAC frame is transferred to the one or more backbone ports (the second relay process). If predetermined conditions of neither the first transfer process (1) nor the second transfer process (2) are not satisfied for a MAC frame, the MAC frame is discarded. Otherwise, the first transfer process (1) and/or the second transfer process (2) can be executed for the MAC frame. In the edge bridge 2, when a backbone MAC frame is received from a backbone port, if the received backbone MAC frame contains a MAC frame in which the user data is encapsulated, then the backbone MAC frame is passed to the MAC relay portion, which in turn executes the following transfer processes. (3) If there exist one or more customer ports which correspond to a service VLAN ID corresponding to the MAC frame, the MAC frame is transferred to the one or more customer ports (the third relay process); (4) if there exist one or more backbone ports other than the recipient of the backbone MAC frame which backbone ports are to transfer the backbone MAC frame, then the MAC frame is transferred to the one or more backbone ports (the fourth relay process). If predetermined conditions of neither the third transfer process (3) nor the fourth transfer process (4) are not satisfied for the received backbone MAC frame, the received backbone MAC frame is discarded. Otherwise, the third transfer process (3) and/or the fourth transfer process (4) can be executed for the received backbone MAC frame.

As the destination to which a MAC frame is transferred, any of a destination backbone port, a destination customer port, a destination edge bridge and a destination MAC address is used. There is predetermined in advance a destination group ID to identify a group of destinations to which a backbone MAC frame is transferred. The edge bridge 2 is provided with a destination group ID look-up table 2-T1 which enables a look-up of a destination group ID by using, as a key, any one or combination of a part or the entirety of header information of a MAC frame, a port which has received the MAC frame and a service VLAN ID corresponding to the MAC frame, and a backbone port look-up table 2-T2 which enables a look-up of at least one backbone port which is to transmit or at least one backbone port which is not to transmit by using a destination group ID as a key.

If the edge bridge 2 receives a MAC frame from a customer port 2-C, the edge bridge searches the destination group ID look-up table 2-T1 for a destination group ID by using, as a key, any one or combination of a part or the entirety of header information of the MAC frame, the port which has received the MAC frame and the service VLAN ID corresponding to the MAC frame (a destination group ID look-up step). If a destination group ID is found in the destination group ID look-up step and the MAC relay portion transfers the MAC frame to one or more backbone ports, the found destination group ID is set in a predetermined field of a backbone MAC frame which contains a service VLAN ID corresponding to the MAC frame (a destination group ID setting step). The edge bridge searches the backbone port look-up table 2-T2 for backbone port(s) by using the found destination group ID as a key (a backbone port look-up step). If one or more backbone ports which are to transmit are found in the backbone port look-up step, the backbone MAC frame is enabled to be transmitted to the one or more backbone ports. If one or more backbone ports which are not to transmit are found in the backbone port look-up step, the backbone MAC frame is disabled to be transmitted to the one or more backbone ports.

In this case, though the edge bridge may set the destination group ID in the backbone MAC frame as the destination address, if the backbone MAC frame contains at least a transfer-purpose VLAN ID which corresponds to the MAC frame as shown in FIG. 10, the edge bridge 2 may set the destination group ID in the backbone MAC frame as the transfer-purpose VLAN ID. Also, the edge bridge 2 may set the destination group ID in the backbone MAC frame as the service VLAN ID or as a combination of the service VLAN ID and the destination address.

As a flooding reduction method according to another embodiment of the invention, provided is a flooding reduction method in a network in which there are combined at least one edge bridge and at least one operation device which is provided with a function of enabling input and output by a network administrator and performs at least one of setting, operation, administration and monitoring of the edge bridge(s). The operation device have a destination routing information table which enables a look-up of a destination group ID by using, as a key, a set of destinations to which a MAC frame is transferred. This method includes a destination routing information table searching step wherein, when the network administrator inputs a set of destinations, the operation device searches the destination routing information table by using the set of destinations as the key, a destination group ID outputting step wherein, if an destination group ID is found in the destination routing information table searching step, the operation device outputs the found destination group ID and, otherwise, the operation device assigns an unused destination group ID to the set of destinations, registers this combination in the destination routing information table, and outputs the destination group ID.

Also, as a flooding reduction method according to still another embodiment of the invention, provided is a flooding reduction method in a network in which there are combined at least one edge bridge, at least one backbone bridge and at least one operation device which is provided with a function of enabling input and output by a network administrator and performs at least one of setting, operation, administration and monitoring of the edge bridge(s). Each of the backbone bridges is provided with one or more backbone ports which each receive a backbone MAC frame from the backbone network and, when a backbone MAC frame is received from a backbone port, passes the backbone MAC frame to its own MAC relay portion. Then, the MAC relay portion transfers the passed backbone MAC frame to one or more backbone ports other than the backbone port that has received the backbone MAC frame (the fifth relay process) or discards the passed backbone MAC. The backbone bridge has a backbone port look-up table which enables a look-up of one or more backbone ports which are to transmit or one or more backbone ports which are not to transmit by using the destination group ID as the key. This method includes a destination group ID extracting step wherein, when receiving a backbone MAC frame from a backbone port, the backbone bridge extracts the destination group ID from the backbone MAC frame; a backbone port look-up step of looking up a backbone port in the backbone port look-up table by using, as the key, the destination group ID extracted in the destination group ID extracting step; and a step wherein, if one or more backbone ports which are to transmit are found in the backbone port look-up step, the backbone MAC frame is enabled to be transmitted to the one or more backbone ports and wherein, if one or more backbone ports which are not to transmit are found in the backbone port look-up step, the backbone MAC frame is disabled to be transmitted to the one or more backbone ports.

Also, as a flooding reduction method according to still another embodiment of the invention, provided is a flooding reduction method in a network in which there are combined at least one edge bridge, at least one backbone bridge and at least one operation device which is provided with a function of enabling input and output by a network administrator and performs at least one of setting, operation, administration and monitoring of the edge bridge(s). Each of the backbone bridges is provided with one or more backbone ports which each receive a backbone MAC frame from the backbone network and, when a backbone MAC frame is received from a backbone port, passes the backbone MAC frame to its own MAC relay portion. Then, the MAC relay portion transfers the passed backbone MAC frame to one or more backbone ports other than the backbone port that has received the backbone MAC frame (the fifth relay process) or discards the passed backbone MAC. The operation device is provided with a function of performing at least one of setting, operation, administration and monitoring of the one or more backbone bridges; a topology information table which enables a look-up of edge bridge(s) and backbone bridge(s) connected with the device and backbone ports at both ends of each connection by using an edge bridge or a backbone bridge as the key; a route calculator for searching the topology information table by using a plurality of destinations as the key and outputting edge bridge(s) and/or backbone bridge(s) constituting the routes among the plurality of destinations and relevant backbone ports of the bridges; and a backbone routing information table which enables a look-up of a set of edge bridges), backbone bridge(s) and backbone ports by using a destination group ID as the key. This method includes a step wherein, when the network administrator inputs a set of destinations, if the operation device assigns a new destination group ID to the set of destinations in a manner defined in claim 6, then the operation device passes the set of destinations to the route calculator to cause the route calculator to output edge bridge(s), backbone bridge(s) and relevant backbone ports; a step of registering a combination of the destination group ID corresponding to the set of destinations and the output result in the backbone routing information table; a step of outputting, to each of edge bridge(s) and backbone bridge(s) included in the output result, setting information of a corresponding backbone port; and a step wherein, when receiving the setting information of the corresponding backbone port, each of the edge and backbone bridges updates the setting of the corresponding backbone port according to the received setting information.

It is noted that in the flooding reduction method according to the invention, it is preferable to use any of the destination backbone port, the destination customer port, the destination edge bridge and the destination MAC address as the transfer destination of the MAC frame.

On the other hand, the present invention can be embodied as a flooding reduction apparatus (or system). A flooding reduction apparatus according to one embodiment of the invention is a one which uses the flooding reduction method. The edge bridge comprises a destination group identifier (ID) look-up table which enables the looking up of a destination group ID using, as a key, at least one or any combination of a part or the entirety of header information of a MAC frame, a port which has received the MAC frame and a service VLAN identifier corresponding to the MAC frame; and a backbone port look-up table which enables the looking up of one or more backbone ports which transmit or do not transmit by using the destination group ID as a key. The flooding reduction apparatus according to this embodiment of the invention includes destination group ID look-up means, operative in case of receiving a MAC frame from a customer port, for looking up a destination group ID in the destination group ID look-up table by using as the key at least one or any combination of the header information of the MAC frame, a port which has received the MAC frame and a service VLAN ID corresponding to the MAC frame; destination group ID setting means, operative in the event that any destination group ID is looked up and the MAC frame is transferred to one or more backbone ports by a MAC relay portion, for setting the looked-up destination group ID to a predetermined field in a backbone MAC frame which includes the service VLAN ID corresponding to the MAC frame; backbone port look-up means for looking up a backbone port in the backbone port look-up table by using the looked-up destination group ID as the key; and transmission control means, operative in the event that one or more backbone ports which are to transmit are found by the backbone port look-up means, for enabling a transmission of the backbone MAC frame to the found backbone port(s) and, operative in the event that one or more backbone ports which are not to transmit are found by the backbone port look-up means, for disabling the transmission of the backbone MAC frame to the found backbone port(s).

In another embodiment, a flooding reduction apparatus of the invention may be realized as a flooding reduction apparatus for use in a network system which is a combination of the above described configuration and one or more operation devices each of which is provided with a function of enabling input and output by a network administrator and performs at least one of setting, operation, administration and monitoring of one or more edge bridges. The operation device have a destination routing information table which enables a look-up of a destination group ID by using, as a key, a set of destinations to which a MAC frame is transferred. In the flooding reduction apparatus according to the embodiment, the operating device includes a destination routing information table searching means, operative in the event that the network administrator inputs a set of destinations, for searching the destination routing information table by using the set of destinations as the key, and a destination group ID outputting means which, if an destination group ID is found by the destination routing information table searching means, outputs the found destination group ID and, otherwise, assigns an unused destination group ID to the set of destinations, registers this combination in the destination routing information table, and outputs the destination group ID.

In still another embodiment, a flooding reduction apparatus of the invention may be realized as a flooding reduction apparatus for use in a network system which is a combination of the above-described configuration and one or more backbone bridges which are each provided with one or more backbone ports for each receiving and transmitting a backbone MAC frame from and to the backbone network. When receiving a backbone MAC frame from a backbone port, each backbone bridge passes the backbone MAC frame to its own MAC relay portion, which in turn executes the above described fifth relay process of transferring the passed backbone MAC frame to one or more backbone ports other than the backbone port that has received the backbone MAC frame, or discards the passed backbone MAC. The backbone bridge has a backbone port look-up table which enables the looking up of one or more backbone ports which transmit or do not transmit by using the destination group ID as a key. In the flooding reduction apparatus according to the embodiment, the backbone bridge includes destination group ID extracting means which, when receiving a backbone MAC frame from a backbone port, extracts the destination group ID from the backbone MAC frame; a backbone port look-up means for looking up a backbone port in the backbone port look-up table by using, as the key, the destination group ID extracted by the destination group ID extracting means; and transmission control means which, if one or more backbone ports which are to transmit are found by the backbone port look-up means, enables the backbone MAC frame to be transmitted to the one or more backbone ports and, if one or more backbone ports which are not to transmit are found by the backbone port look-up means, disables the backbone MAC frame to be transmitted to the one or more backbone ports.

In still another embodiment, if the operation device in a flooding reduction apparatus of the invention is further provided with a function of performing at least one of setting, operation, administration and monitoring of the one or more backbone bridges; a topology information table which enables a look-up of edge bridge(s) and backbone bridge(s) connected with the device and backbone ports at both ends of each connection by using an edge bridge or a backbone bridge as the key, a route calculator for searching the topology information table by using a plurality of destinations as the key and outputting edge bridge(s) and/or backbone bridge(s) constituting the routes among the plurality of destinations and relevant backbone ports of the bridges; and a backbone routing information table which enables a look-up of a set of edge bridge(s), backbone bridge(s) and backbone ports by using a destination group ID as the key, then the flooding reduction apparatus may be so realized as to include output means which, when the network administrator inputs a set of destinations, if a new destination group ID corresponding to the set of destinations is assigned, passing the set of destinations to the route calculator to cause the route calculator to output edge bridge(s), backbone bridges) and relevant backbone ports; backbone routing information table register means for registering a combination of the destination group ID corresponding to the set of destinations and the output result in the backbone routing information table; setting information outputting means, of a backbone port, for outputting, to each of edge bridge(s) and backbone bridge(s) included in the output result, setting information of a corresponding backbone port; and backbone port setting updating means, operative in the event that each of the edge and backbone bridges receives, from the operation device, the same setting information as that from the setting information outputting means of the backbone port, for updating the setting of the backbone port according to the received setting information.

Figure 5:
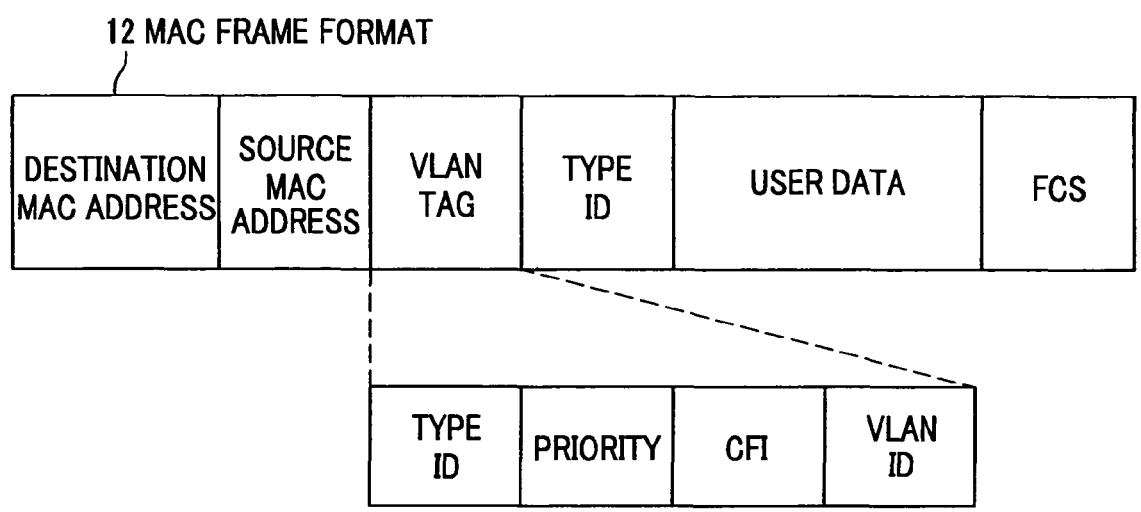
FIG. 5 is a format diagram for a MAC frame received and transmitted at a customer port of the edge bridge to which a flooding reduction method according to the first or the second embodiment of the invention is applied.

In various embodiments of the invention, the edge bridge which provides the VLAN service for the customers may have customer ports which each receive and transmit a MAC frame 12 with a format as shown in FIG. 5 from and to a customer site and backbone ports for receiving and transmitting a backbone MAC frame from and to the backbone network. The provider identifies each VLAN provided for a customer by a service VLAN ID. There are various MAC frame forms 13 through 16 in the backbone MAC frames received and transmitted through the backbone ports as shown in FIGS. 7 through 10, respectively. In any of the backbone MAC frames, a MAC frame and a service VLAN ID corresponding to the MAC frame are encapsulated.

The edge bridge in a flooding reduction method according to any of the above-mentioned embodiments of the invention receives a MAC frame from a customer site, examines the header information of the received MAC frame, the received customer port, and the service VLAN ID, and sets a destination group ID corresponding to the MAC frame. The destination group ID is given in any form of the destination address of the backbone MAC frame, the transfer-use VLAN ID, the service VLAN ID and the combination of the destination address and the service VLAN ID. The destination group ID is set to a backbone MAC frame. If the edge and backbone bridges are to transfer a backbone MAC frame to which the destination group ID is set, the bridges make a test of the destination group ID before transferring it to see if a transmission from a backbone port is enabled.

As is apparent from the foregoing, the present invention is much different as compared with the prior art in that in a flooding reduction method of customer MAC frames in a VLAN service provided by a provider for the customers, only examining a single field of the backbone MAC frame header suffices; there is no need of every device on the routes having a control protocol installed therein or snooping into routing information exchanged in an upper layer, and, in certain embodiments, the bridges (backbone bridges) on the routes need not retain setting information separated by the customer.

A flooding reduction method according to the invention has a first advantage that when each edge bridge receives a MAC frame from a customer site, the edge bridge examines the header information of the MAC frame, the received customer port and the service VLAN ID and sets a destination group ID corresponding to the MAC frame, which results in the edge and backbone bridges having only to examine a single field of the backbone MAC frame header, a second advantage that there is no need of every device on the routes having a control protocol installed therein or snooping into routing information exchanged in an upper layer, and a third advantage that, in certain embodiments, the bridges on the routes need not retain setting information separated by the customer. Therefore, a flooding reduction method of customer MAC frames in a VLAN service provided by the provider for the customers according to the invention has a remarkable effect of preventing undesired traffics caused by a flooding from affecting other customer's transfer processes and from disturbing communications via sites of narrower bands.

FIRST EMBODIMENT

=Edge+Core+Ops+B−DA+CVLAN Filter

Referring to FIG. 1, a flooding reduction method as a MAC frame transfer method and a flooding reduction apparatus according to a first embodiment (embodiment 1) of the invention will be described as a more specific structural example in the following.

FIG. 1 is a block diagram showing an exemplary arrangement of a network to which a flooding reduction method according to the first embodiment of the invention is applied. As shown in FIG. 1, a backbone network 1 according to the embodiment comprises a plurality of edge bridges 2A through 2E and a plurality of backbone bridges 3A through 3E. The backbone network 1 is connected with customer 4A via edge bridge 2A, with customer 4B via primary edge bridge 2B, with customer 4C via primary edge bridge 2C, and with customer 4D via edge bridge 2D. Also, an operation device 5 is connected with all edge bridges 2A through 2E and all backbone bridges 3A through 3E of the backbone network 1. Each of the bridges 2A through 2E and 3A through 3E of the backbone network 1 is a bridge or a switch which includes a not-shown processor and not-shown memories (such as RAM, ROM, flash memory, etc). The flooding reduction method according to the present embodiment of the invention may be distributed via and/or stored in computer-readable storage media in the form of program codes. The flooding reduction method is installed in a network system by storing such program codes in an internal or external storage of each bridge as a combination of processing modules.

Figure 2A:
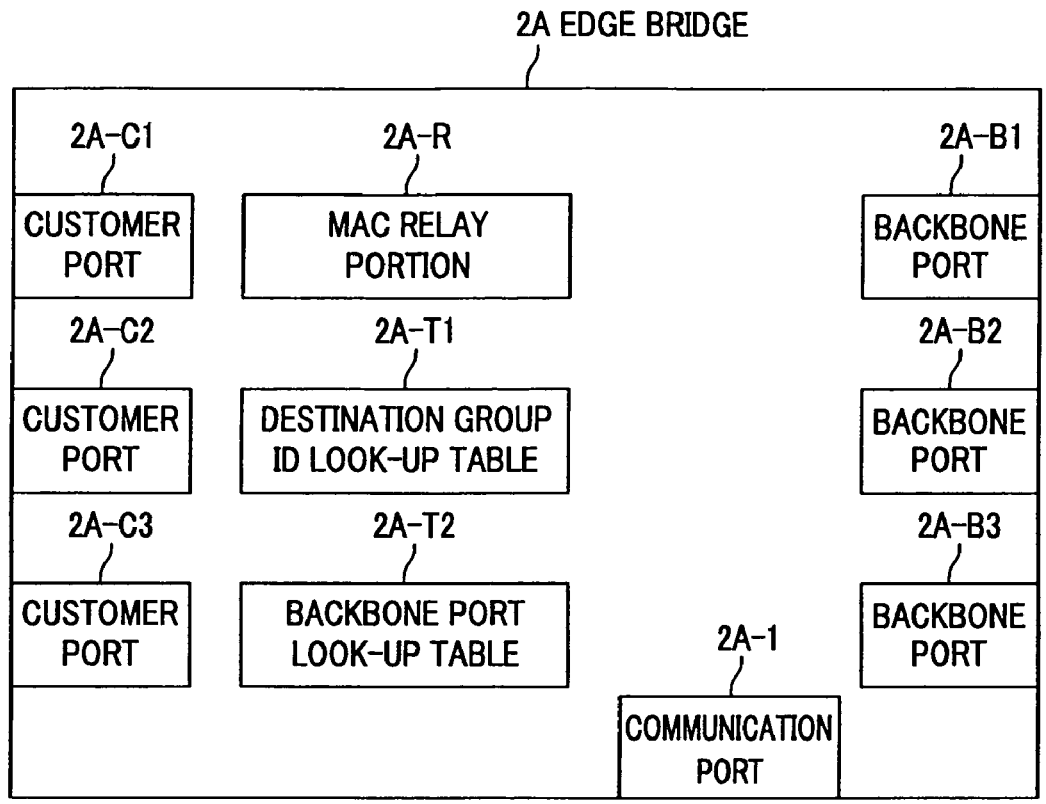
FIG. 2A is a functional block diagram showing an exemplary configuration of an edge bridge to which a flooding reduction method according to the first or a second embodiment of the invention is applied.
Figure 2B:
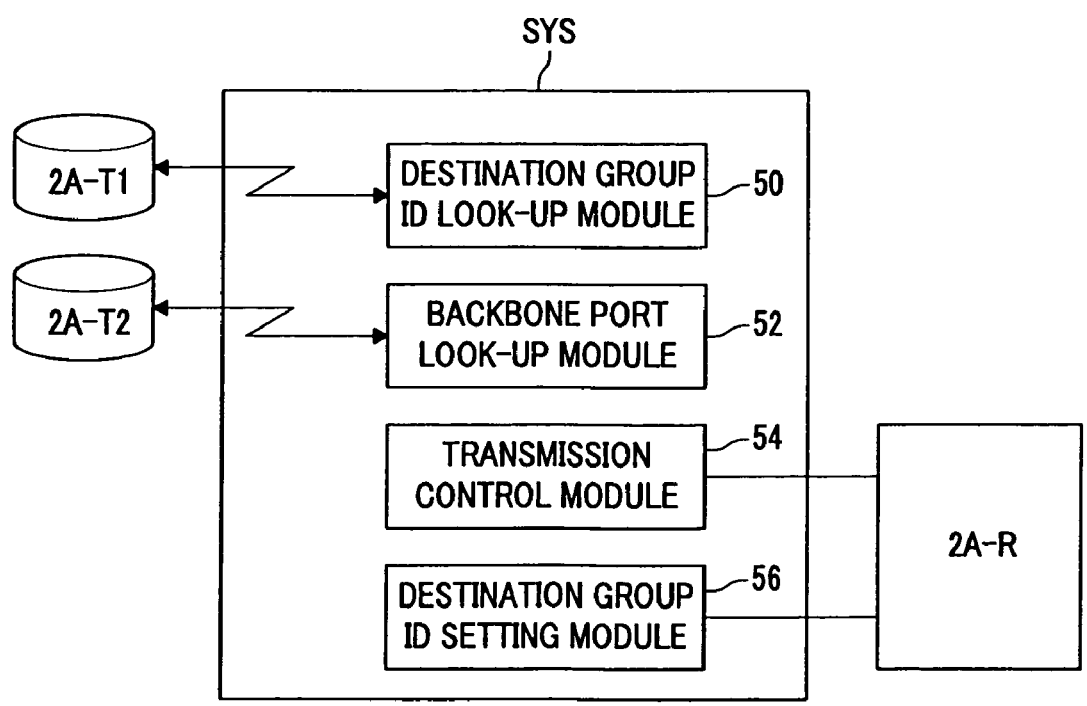
FIG. 2B is a block diagram showing an exemplary configuration of means (or a module) for controlling the edge bridge in a system for flooding reduction.

FIG. 2 shows an exemplary arrangement of an edge bridge in the present embodiment. In an example shown in FIG. 2A, an edge bridge 2A has a plurality of customer ports 2A-C1 through 2A-C3, a plurality of backbone ports 2A-B1 through 2A-B3, a MAC relay portion 2A-R, a destination group ID look-up table 2A-T1, a backbone port look-up table 2A-T2 and a communication port 2A-1. The numbers of customer ports and backbone ports may be determined as needed. The communication port may be replaced by a customer or backbone port FIG. 2B shows an exemplary arrangement of means (or a module) for controlling the edge bridge 2A in a system SYS for reducing the flooding according to the embodiment. In one embodiment, the system SYS includes a destination group ID look-up module 50, a backbone port look-up module 52, a transmission control module 54 and a destination group ID setting module 56 as shown in FIG. 2A. The destination group ID look-up module 50 is connected with the destination group ID look-up table 2A-T1. When the edge bridge 2A receives a MAC frame or a backbone MAC frame, the destination group ID look-up module 50 searches the destination group ID look-up table 2A-T1 to obtain a destination group ID. The backbone port look-up module 52, which is connected with the backbone port look-up table 2A-T2, searches the backbone port look-up table 2A-T2 with the obtained destination group ID and judges whether there is a MAC frame with the destination group ID or one or more backbone ports which are to transfer a backbone MAC frame. The transmission control module 54 and the destination group ID setting module 56 are connected with the MAC relay portion 2A-R and perform processing based on the judgment. Specifically, if backbone port look-up module 52 finds, from the backbone ports, one or more backbone ports which each transfer a MAC frame or a backbone MAC frame, the transmission control module 54 makes the one or more backbone ports in a transmission enable state and the other backbone ports in a transmission disable state. Also, if it is judged that a MAC frame received from a customer port should be transferred, then the MAC relay portion 2A-R forms a backbone MAC frame by adding data such as a service VLAN ID to the MAC frame, and the destination group ID setting module 56 sets the destination group ID obtained by the destination group ID look-up module 50 to the backbone MAC frame to be transferred to the one or more backbone ports by the MAC relay portion 2A-R. The modules 50, 52, 54 and 56 and the tables 2A-T1 and 2A-T2, which are usually stored in a storage device within the edge bridge 2A, may externally stored so that the edge bridge 2A is controlled via communication port 2A-1 for example.

Figure 3A:
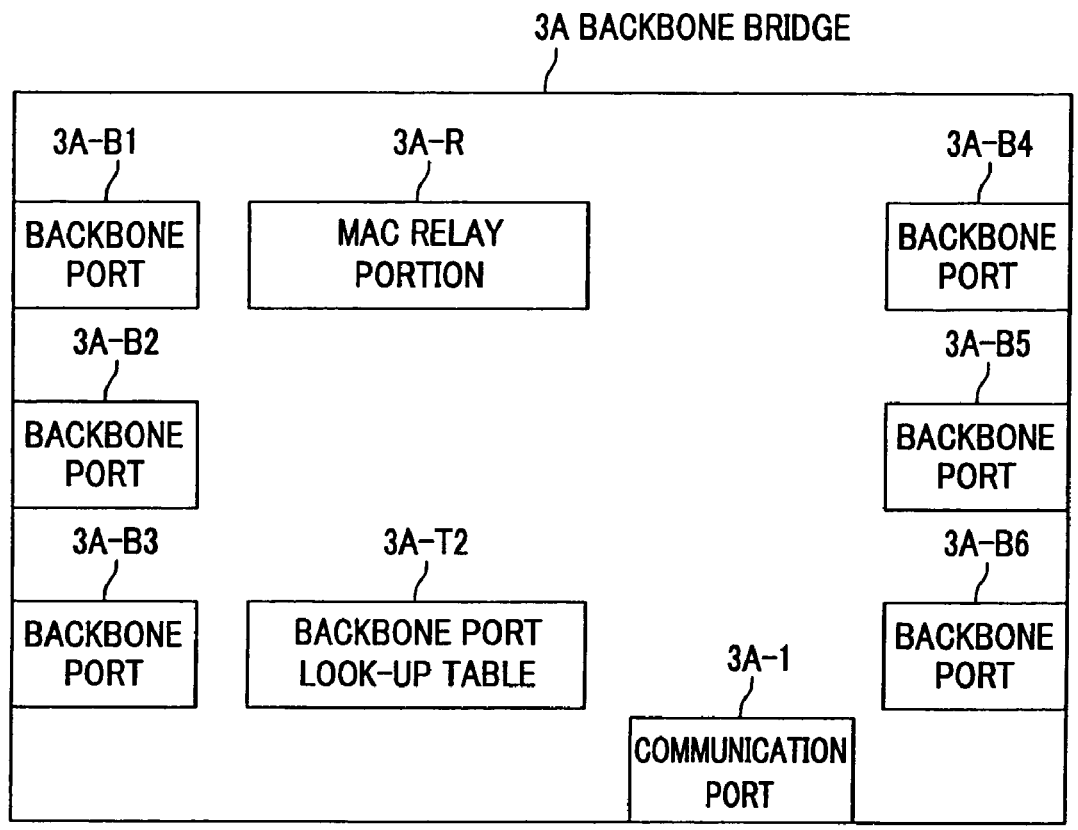
FIG. 3A is a functional block diagram showing an exemplary configuration of a backbone bridge to which the flooding reduction method according to the first or the second embodiment of the invention is applied.
Figure 3B:
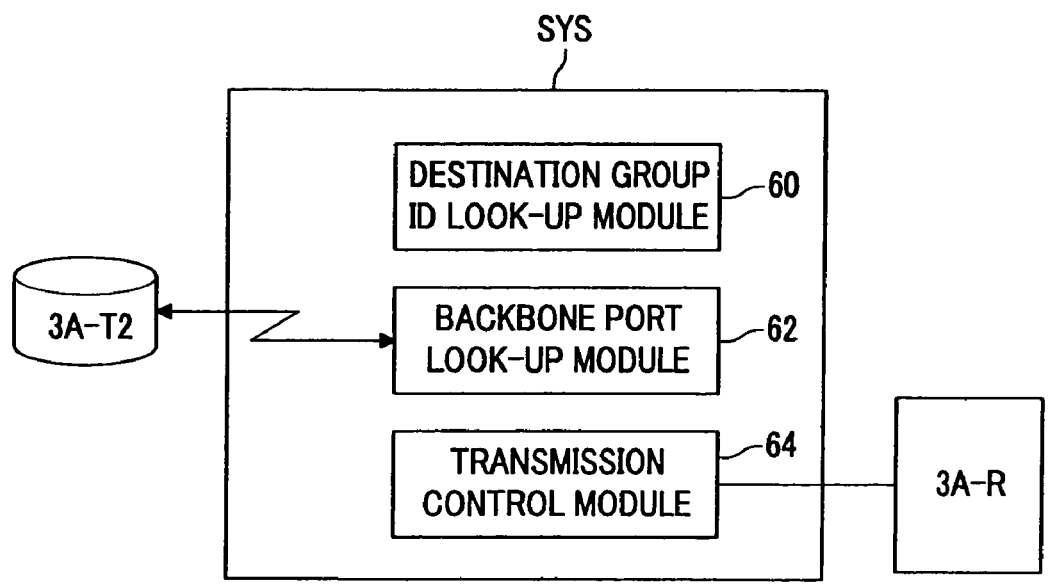
FIG. 3B is a block diagram showing an exemplary configuration of means (or a module) for controlling the backbone bridge in the system for flooding reduction.

FIG. 3 shows an exemplary arrangement of a backbone bridge in the present embodiment. In an example shown in FIG. 3A, a backbone bridge 3A has a plurality of backbone ports 3A-B1 through 3A-B6, a MAC relay portion 3A-R, a backbone port look-up table 3A-T2 and a communication port 3A-1. The number of backbone ports may be determined as needed. It is noted that the communication port may be replaced by a backbone port FIG. 3B shows an exemplary arrangement of means (or a module) for controlling the backbone bridge 3A in a system SYS for reducing the flooding according to the embodiment. In one embodiment, the system SYS includes a destination group ID extracting module 60, a backbone port look-up module 62 and a transmission control module 64 as shown in FIG. 3B. The destination group ID extracting module 60 extracts the destination group ID from a backbone MAC frame received through a backbone port from the backbone network1. The backbone port look-up module 62, which is connected with the backbone port look-up table 3A-T2, searches the backbone port look-up table 3A-T2 with the destination group ID of the backbone MAC frame extracted by the destination group ID extracting module 60 and judges whether there is one or more backbone ports which each transfer the backbone MAC frame in the backbone ports other than the one that has received the backbone MAC frame. If the backbone port look-up module 62 finds, from the plurality of backbone ports, one or more backbone ports which each transfer a backbone MAC frame, the transmission control module 64, which is connected with the MAC relay portion 3A-R, makes the one or more backbone ports in a transmission enable state and the other backbone ports in a transmission disable state. The modules 60, 62 and 54 and the table 3A-T2, which are usually stored in a storage device within the backbone bridge 3A, may be externally stored so that the backbone bridge 3A is controlled via communication port 3A-1 for example.

Figure 4A:
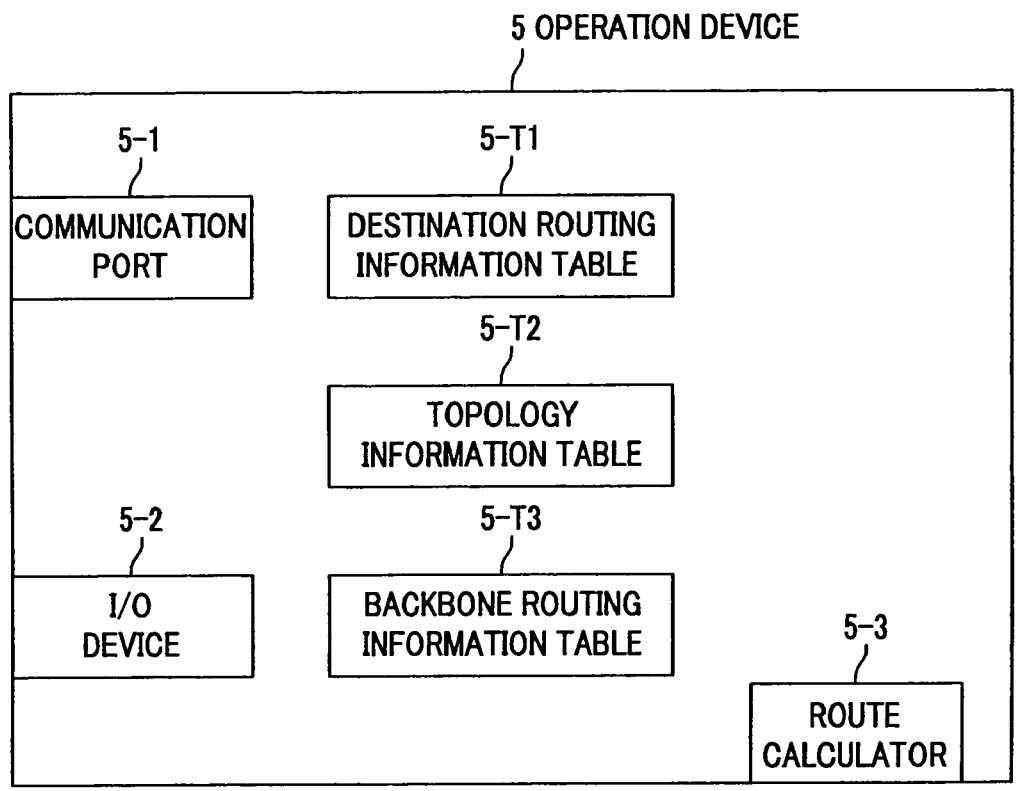
FIG. 4A is a functional block diagram showing an exemplary configuration of an operation device to which the flooding reduction method according to the first or the second embodiment of the invention is applied.
Figure 4B:
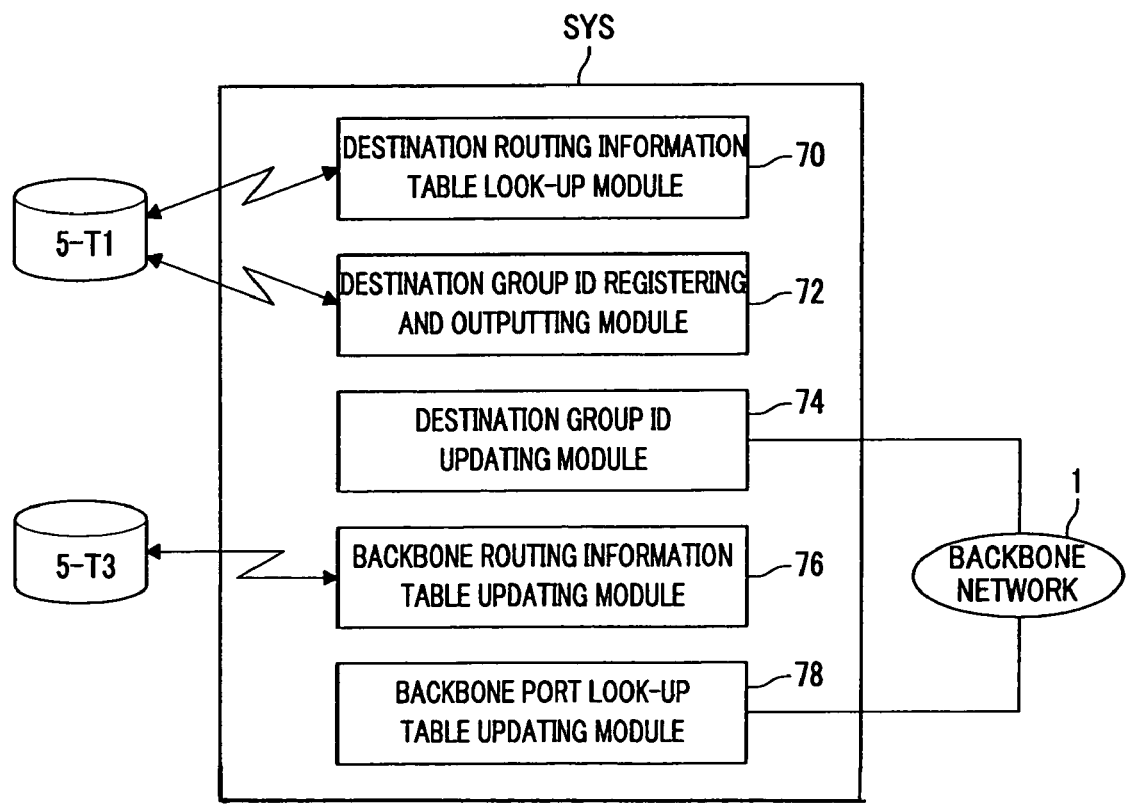
FIG. 4B is a block diagram showing an exemplary configuration of means (or a module) for controlling the operation device in the system for flooding reduction.

FIG. 4 shows an exemplary arrangement of an operation device in the present embodiment. In a example shown in FIG. 4A, the operation device 5 has a destination routing information table 5-T1, a topology information table 5-T2, a backbone routing information table 5-T3, a communication port 5-1, an input and output (I/O) device 5-2 for the administrator and a route calculator 5-3. FIG. 4B shows an exemplary arrangement of means (or a module) for controlling the operation device 5 in a system SYS for reducing the flooding according to the embodiment. In one embodiment, the system SYS includes a destination routing information table look-up module 70, a destination group ID registering and outputting module 72, a destination group ID updating module 74, a backbone routing information table updating module 76 and a backbone port (look-up) table updating module 78 as shown in FIG. 4B. The destination routing information table look-up module 70 and the destination group ID registering and outputting module 72 are connected with the destination routing information table 5-T1. The destination routing information table look-up module 70 searches the destination routing information table 5-T1 with a set of destinations input by the network administrator through the I/O device 5-2. If the destination routing information table look-up module 70 has found a destination group ID corresponding to the set of input destinations, then the destination group ID registering and outputting module 72 outputs the found destination group ID. Otherwise, the destination group ID registering and outputting module 72 assigns an unused destination group ID to the set of input destinations, registers the assigned destination group ID in the destination routing information table 5-T1, and outputs the assigned destination group ID. On the basis of the destination routing information table 5-T1 which includes the assigned destination group ID, the destination group ID updating module 74 updates the destination group ID look-up tables (e.g., 2A-T1 of FIG. 2) included in one or more of all the edge bridges connected with the backbone network 1 which one or more edge bridges are the destinations of a backbone MAC frame with the destination group ID. The topology information table 5-T2 records the topology information therein so as to enable searching and updating. For a given destination group ID, the topology information indicates the physical connection pattern of nodes comprised of all edge bridges 2A through 2E and all backbone bridges 3A through 3E connected with the backbone network 1. If the destination group ID registering and outputting module 72 registers a new destination group ID in the destination routing information table 5-T1, the route calculator 5-3 searches the topology information table 5-T2 for one or more routes through which a backbone MAC frame with the assigned new destination group ID is transferred to one or more destinations identified by the assigned new destination group ID and outputs edge bridges, backbone bridges and backbone ports which are used for the transfer process. The backbone routing information table 5-T3 registers a given destination group ID therein, so as to enable searching and updating, in association with a set of edge and backbone bridges and backbone ports which are used for transferring a backbone MAC frame with the destination group ID. The backbone routing information table updating module 76, which is connected with the backbone routing information table 5-T3, updates the table 5-T3 by registering the assigned new destination group ID and the set of output edge bridges, backbone bridges and backbone ports. If the backbone routing information table updating module 76 updates the backbone routing information table 5-T3 with the assigned new destination group ID, the backbone port look-up table updating module 78 updates, based on the updated backbone routing information table 5-T3, information of each port on whether the port is capable of relaying a backbone MAC frame corresponding to the assigned new destination group ID in each of backbone port look-up tables (e.g., 2A-T2 and 3A-T2) included in edge bridges and backbone bridges which are used as transfer routes for a backbone MAC frame with the assigned new destination group ID. The modules 70, 72, 74, 76 and 78 and the tables 5-T1, 5-T2 and 5-T3, which are usually stored in a storage device within the operation device 5, may be externally stored so that the operation device 5 is controlled via communication port 5-1 for example.

In the customer networks 4A through 4D, information is communicated in the form of a MAC frame format 12 as shown in FIG. 5. The customer MAC frame comprises a destination MAC address, a source MAC address, a VLAN tag and user data as shown in FIG. 5. The VLAN tag includes information such as a priority and VLAN ID, etc. In some networks, the customer MAC frame has not necessarily to include the VLAN tag. The customer MAC frame format 12 complies with a series of IEEE 802 standards (IEEE=Institute of Electrical and Electronics Ingineers).

The customer network 4A includes a logical network VLAN 10(4A-1), in which a terminal 4A-11 is connected. The customer network 4B includes logical networks VLAN 10(4B-1) and VLAN 20(4B-2), and a terminal 4B-11 is connected in the logical network VLAN 10(4B-1).

The customer network 4C includes logical networks VLAN 10(4C-1) and VLAN 20(4C-2), and a terminal 4C-21 is connected in the logical network VLAN 20(4C-2). The customer network 4D includes a logical network VLAN 20(4D-2), in which a terminal 4A-21 is connected.

It is assumed that the customer networks 4A through 4D belong to a single service VLAN 100.

Also, in this embodiment, it is assumed that a destination group ID is provided as the destination address of the backbone MAC frame and that a destination edge bridge is used as the destination to which a MAC frame is transferred.

In this embodiment, when the network administrator inputs in the operation device 5 through the I/O device 5-2, edge bridges 2A through 2C which are destinations of VLAN 10(4A-1, 4B-1 and 4C-1) belonging to customer networks 4A through 4C of the service VLAN 100, the operation device 5 searches the destination routing information table 5-T1 by using the set of edge bridges as the key. If a destination group ID is found, the operation device 5 assigns the search result as the destination group ID for the VLAN 10 of the service VLAN. Otherwise, the operation device 5 assigns a new destination group ID to the set of edge bridges and registers a combination of the new destination group ID and the set of edge bridges in the destination routing information table 5-T1.

The operation device 5 sets a combination of the service VLAN, VLAN 10 and a destination group ID obtained by any of above-mentioned means to the edge bridges 2A through 2C through the communication port 5-1.

The edge bridges 2A through 2C receive the setting information through respective communication ports (2A-1 for example) and register the setting information in respective destination group ID look-up tables 2A-T1 through 2C-T1.

In this embodiment, if a new destination group ID is assigned in response to the search result, the operation device 5 passes the set of edge bridges to the route calculator 5-3, which in turn refers to the topology information table 5-T2 and outputs edge bridges 2A through 2C and backbone bridges 3A through 3C which are to constitute the routes for the relay among the edge bridges 2A through 2C, and the backbone ports of the edge and backbone bridges. Then, the operation device 5 registers a combination of the new destination group ID and the output results in the backbone routing information table 5-T3, and sends backbone port's setting information to the edge bridges 2A through 2C and backbone bridges 3A through 3C included in the output results through the communication port 5-1.

Each of the edge bridges 2A through 2C and backbone bridges 3A through 3C receives the setting information through the communication port (e.g., 3A-1) and executes a registration to the backbone port look-up table 2A-T2 or 3A-T2, respectively.

An edge bridge 2A receives a MAC frame from a terminal 4A-11 included in a customer network 4A. The received MAC frame is in the MAC frame format 12. In the received MAC frame, the destination MAC address indicates a broadcast address, and the source MAC address indicates the source terminal 4A-11 located in the customer network 4A. Also, the VLAN ID indicates the number of the VLAN to which the source and the destination terminals belong. In this specific MAC frame, the VLAN ID is 10.

The edge bridge 2A examines the MAC frame in the MAC relay portion 2A-R to find that the MAC frame is not addressed to a specific destination, and then causes the above-mentioned destination group ID look-up means to search the destination group ID look-up table 2A-T1 for a destination group ID for the MAC frame on the basis of a service VLAN ID judged from the recipient customer port and the VLAN ID of the MAC frame. If the destination group ID is found by the destination group ID look-up means, then the destination group ID is used as the destination address of a backbone MAC frame for transferring the MAC frame.

Then, on the basis of the destination group ID, the edge bridge 2A searches the backbone port look-up table 2A-2T to find a backbone port which is capable of transferring the backbone MAC frame. The edge bridge 2A launches the backbone MAC frame to the found backbone port. The backbone MAC frame goes through the backbone bridge 3A to reach the backbone bridge 3C.

Receiving the backbone MAC frame, the backbone bridge 3C examines the backbone MAC frame in the MAC relay portion 2A-R to fined that the backbone MAC frame is not addressed to a specific destination, then extracts the destination address in the backbone MAC frame, and searches the backbone port look-up table 3A-T2 for backbone ports capable of transferring the backbone MAC frame on the basis of the extracted destination address.

In this case, since there is no VLAN 10 of the service VLAN 100 which is accessible via the backbone bridge 3E in FIG. 1, such backbone ports of the backbone bridge 3C as connect with the backbone bridge 2E are not included in the search results. Similarly, in searching the backbone port look-up table in the backbone bridge 3D, the search results will not include such backbone ports as connect with the edge bridge 3E.

Thus, the backbone MAC frame reaches only the edge bridges 2B and 2C. Each of the edge bridges 2B and 2C extracts the MAC frame from the received backbone MAC frame and launches the MAC frame to the customer network 4C and 4D.

SECOND EMBODIMENT

=Edge+Core+Ops+B−DA+Multicast Filter

Figure 6:
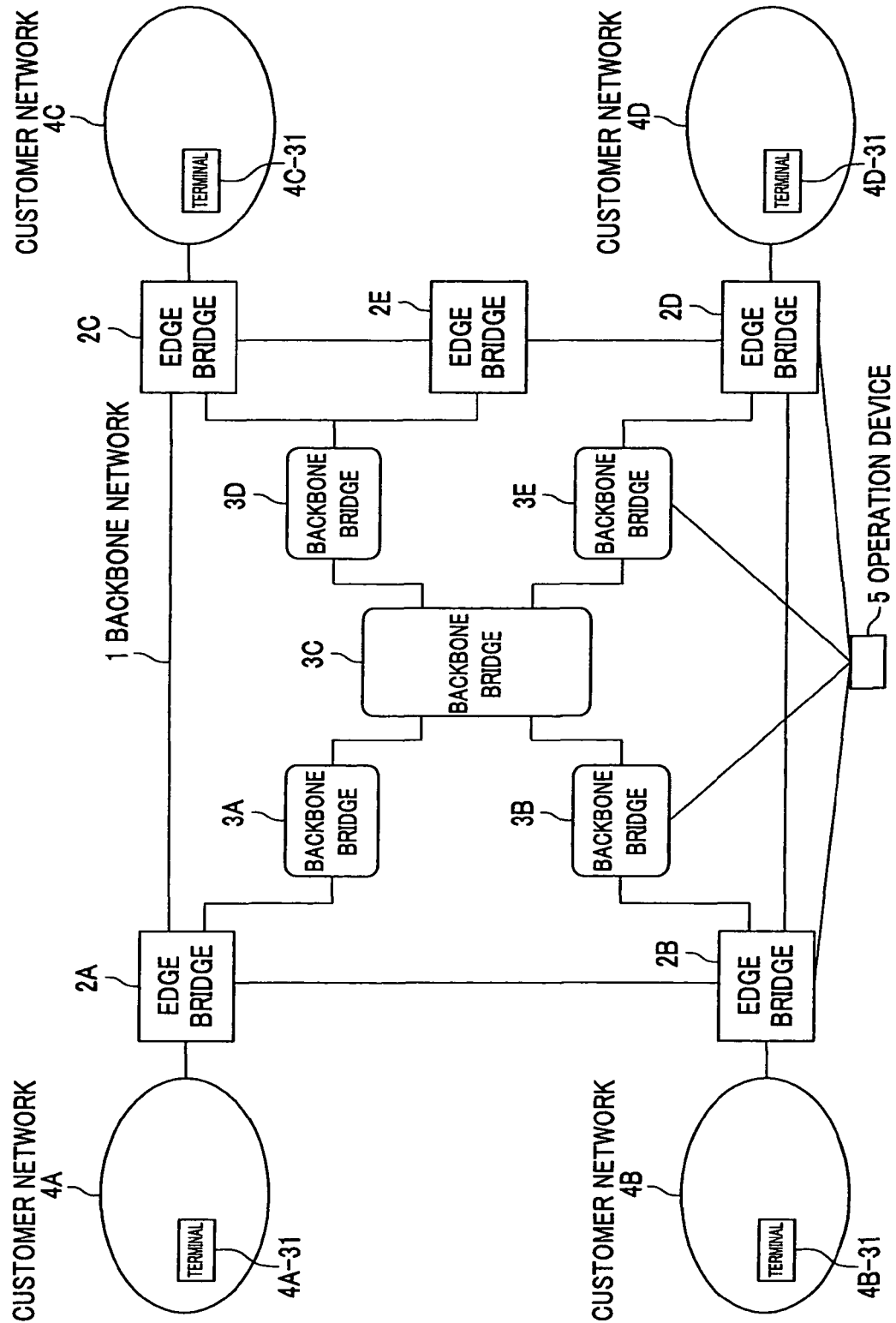
FIG. 6 is a block diagram showing an exemplary configuration of a network to which a flooding reduction method according to the second embodiment of the invention is applied.
Figure 7:
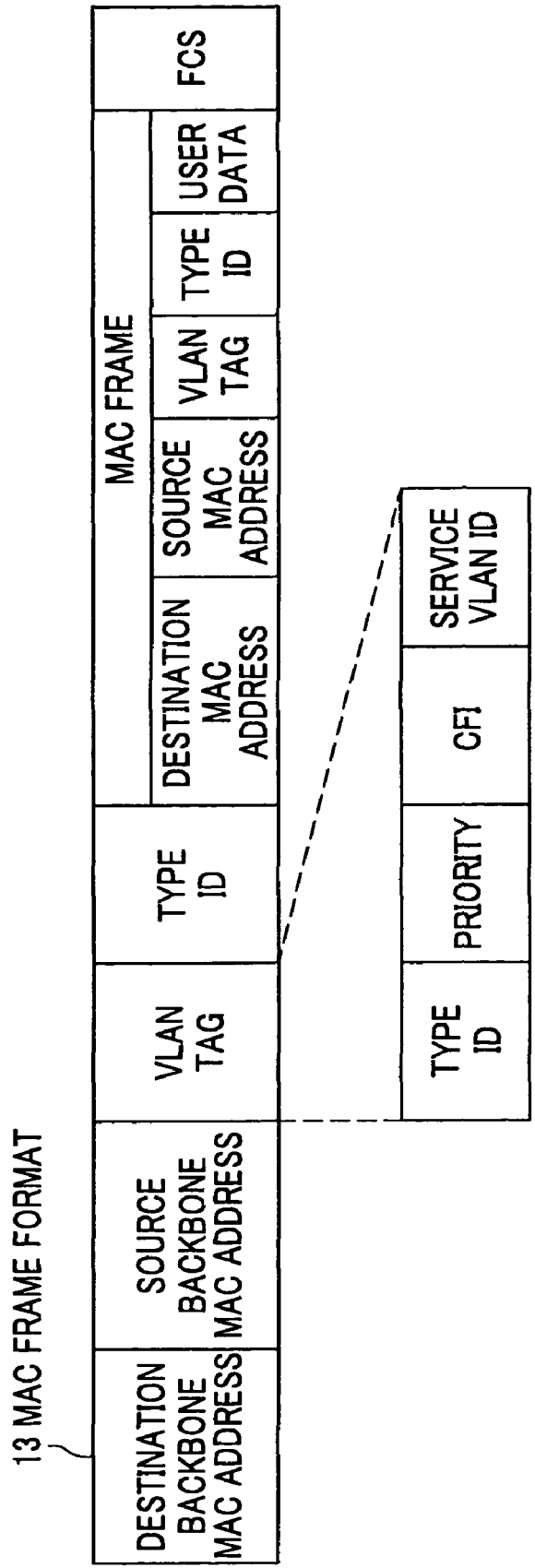
Figure 8:
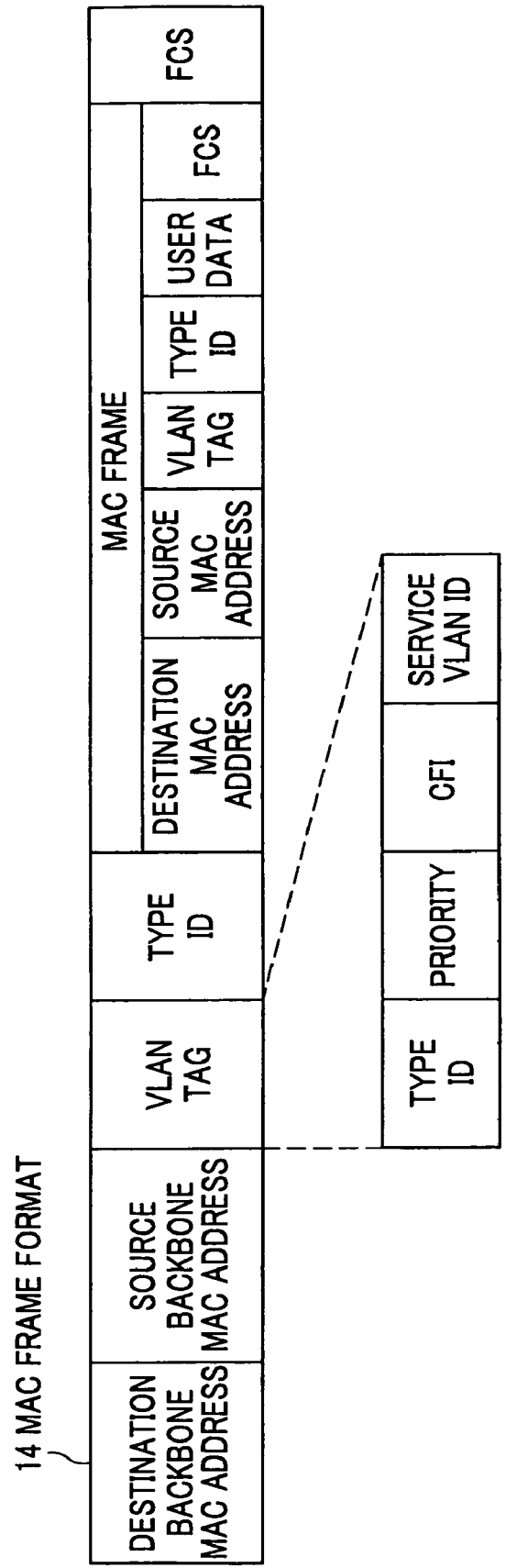

Referring to FIG. 6, a flooding reduction method as a MAC frame transfer method and a flooding reduction apparatus according to a second embodiment (embodiment 2) of the invention will be described in the following.

FIG. 6 shows an exemplary arrangement of a network according to the present invention. Detailed description of the same elements as those of the first embodiment shown in FIG. 1 will be omitted. The structures of edge bridges and backbone bridges are identical to those of the first embodiment and accordingly will not be detailed.

In FIG. 6, to a customer network 4A, there is connected a terminal 4A-31 which receives a multicast group 10. To a customer network 4B, there is connected a terminal 4B-31 which receives a multicast group 10. To a customer network 4C, there is connected a terminal 4C-31 which receives a multicast group 10. To a customer network 4D, there is connected a terminal 4D-31 which does not receive a multicast group 10.

In the embodiment, it is assumed that a destination group ID is provided as the destination address of each backbone MAC frame.

Also, in the embodiment, it is assumed that a destination edge bridge is used as the destination to which a MAC frame is transferred. It is noted that, as described above, a destination backbone port, a destination customer port, a destination MAC address, etc in addition to the destination edge bridge may be used as the destination to which a MAC frame is transferred in the flooding reduction method according to the invention.

When the network administrator inputs in the operation device 5 through the I/O device 5-2, edge bridges 2A through 2C which are destinations of terminals 4A-31, 4B-31 and 4C-31 which receive a multicast group 10 in the customer networks 4A, 4b and 4C of the service VLAN 100, the operation device 5 searches the destination routing information table 5-T1 by using the set of edge bridges as the key. If a destination group ID is found, the operation device 5 assigns the search result as the destination group ID for the multicast group 10 of the service VLAN. Otherwise, the operation device 5 assigns a new destination group ID to the set of edge bridges and registers a combination of the new destination group ID and the set of edge bridges in the destination routing information table 5-T1. A combination of the service VLAN, the multicast group 10 and a destination group ID obtained by any of above-mentioned means is received via the communication port 5-1 and is registered in the destination group ID look-up table 2A-T1.

If a new destination group ID is assigned in response to the search result, the operation device passes the set of edge bridges to the route calculator 5-3, which in turn refers to the topology information table 5-T2 and outputs edge bridges 2A through 2C and backbone bridges 3A through 3C which are to constitute the routes for the relay among the edge bridges 2A through 2C, and the backbone ports of the edge and backbone bridges. Then, the operation device 5 registers a combination of the new destination group ID and the output results in the backbone routing information table 5-T3, and sends backbone port's setting information to the edge bridges 2A through 2C and backbone bridges 3A through 3C included in the output results through the communication port 5-1.

Each of the edge bridges 2A through 2C and backbone bridges 3A through 3C receives the setting information through the communication port (e.g., 3A-1) and executes a registration to the backbone port look-up table 2A-T2 or 3A-T2, respectively.

An edge bridge 2A receives a MAC frame from a terminal 4A-11 included in a customer network 4A. The received MAC frame is in the MAC frame format 12. In the received MAC frame, the destination MAC address indicates a multicast address indicative of the multicast group 10, and the source MAC address indicates the source terminal 4A-11 located in the customer network 4A. Also, it is assumed that there is no VLAN tag.

The edge bridge 2A examines the MAC frame in the MAC relay portion 2A-R to find that the MAC frame is not addressed to a specific destination, and then causes the above-mentioned destination group ID look-up means to search the destination group ID look-up table 2A-T1 for a destination group ID for the MAC frame on the basis of a service VLAN ID judged from the recipient customer port and the multicast address in the destination address field of the MAC frame.

If the destination group ID is found in the search, then the destination group ID is used as the destination address of a backbone MAC frame for transferring the MAC frame.

Then, on the basis of the destination group ID, the edge bridge 2A searches the backbone port look-up table 2A-2T to find a backbone port which is capable of transferring the backbone MAC frame. The edge bridge 2A launches the backbone MAC frame to the found backbone port. The backbone MAC frame goes through the backbone bridge 3A to reach the backbone bridge 3C.

Receiving the backbone MAC frame, the backbone bridge 3C examines the backbone MAC frame in the MAC relay portion 2A-R to fined mat the backbone MAC frame is not addressed to a specific destination, then extracts the destination address in the backbone MAC frame, and searches the backbone port look-up table 3A-T2 for backbone ports capable of transferring the backbone MAC frame on the basis of the extracted destination address. In this case, since there is no terminal that receives the multicast group 10 of the service VLAN 100 via the backbone bridge 3E in FIG. 6, such backbone ports of the backbone bridge 3C as connect with the backbone bridge 3E are not included in the search results. Similarly, in searching the backbone port look-up table 3A-T2 in the backbone bridge 3D, the search results will not include such backbone ports as connect with the edge bridge 2E.

Thus, the backbone MAC frame reaches only the edge bridges 2B and 2C. Each of the edge bridges 2B and 2C extracts the MAC frame from the received backbone MAC frame and launches the MAC frame to the customer network 4C or 4D.

In this way, the bridge broadcasts a MAC frame to all the ports other than the port which has received the MAC frame This eliminates the problems that the terminals connected with a network tend to receive MAC frames unnecessary to receive and that the links interconnecting the bridges are compressed in the band thereof due to MAC frames unnecessary to transfer.

The above-described embodiments are only for the purpose of illustration of the invention. The invention should not be restricted to the above embodiments, and changes and improvements may be made within the principles of the invention.

The invention claimed is:

1. A MAC (media access control) frame transfer method for reducing a flooding in a backbone network with which a plurality of customer local area networks are connected via respective edge bridges which each comprise at least one customer port and at least one backbone port to realize a VLAN (virtual local area network), the method comprising the steps of:
   receiving a MAC frame from one of said customer local area networks via said at least one customer port of each edge bridge;
   identifying a service VLAN ID for said MAC frame from a customer port which received said MAC frame;
   obtaining a destination group ID for identifying a combination of a source of said MAC frame and at least one destination;
   on the basis of said obtained destination group ID, judging whether said at least one backbone port includes one which is to transfer said MAC frame;
   if said at least one backbone port includes at least one backbone port which is to transfer said MAC frame, forming a backbone MAC frame which includes said MAC frame and said service VLAN ID;
   setting said destination group ID in said backbone MAC frame; and
   transferring said backbone MAC frame with said destination group ID set to said at least one backbone port which is to transfer said MAC frame.

2. A MAC frame transfer method as defined in claim 1, further comprising the steps of:
   judging whether said at least one customer port includes at least one customer port which is other than one that has received said MAC frame and corresponds to said identified service VLAN ID; and
   if said at least one customer port includes at least one customer port which is other than one that has received said MAC frame and corresponds to said identified service VLAN ID, then transferring said MAC frame to said included at least one customer port.

3. A MAC frame transfer method as defined in claim 1, further comprising the steps of:
   receiving said backbone MAC frame from said backbone network via said at least one backbone port of one of said edge bridges;
   identifying said destination group ID of said backbone MAC frame;
   on the basis of said identified destination group ID, judging whether said at least one backbone port includes at least one backbone port which is other than one that has received said backbone MAC frame and which said backbone MAC frame is to be transferred to; and
   if the included at least one backbone port exists, transferring said backbone MAC frame to said included at least one backbone port.

4. A MAC frame transfer method as defined in claim 3, further comprising the step of setting a backbone port look-up table in which each destination group ID is recorded in association with at least one backbone port and information on whether each of said at least one backbone port is capable of relaying said backbone MAC frame corresponding to the destination group ID so as to enable searching and alteration thereof, wherein
   said step of judging on the basis of said identified destination group ID includes the step of searching said backbone port look-up table.

5. A MAC frame transfer method as defined in claim 1, further comprising the steps of:
   receiving said backbone MAC frame from said backbone network via said at least one backbone port of each edge bridge;
   judging whether said at least one customer port includes at least one customer port that corresponds to said service VLAN ID of said received backbone MAC frame; and
   if the included at least one customer port exists, extracting said MAC frame from said received backbone MAC frame and transferring said extracted MAC frame to said included at least one backbone port.

6. A MAC frame transfer method as defined in claim 1, further comprising the step of setting a destination group ID look-up table in which at least one of at least a part of header information of said MAC frame, said customer port which received said MAC frame and said service VLAN ID for said MAC frame is recorded in association with said destination group ID so as to enable searching and alteration thereof, wherein
   said step of obtaining a destination group ID includes the step of searching said destination group ID look-up table.

7. A MAC frame transfer method as defined in claim 6, further comprising the steps of:
   setting a destination routing information table in which a set of a source and at least one destination of each MAC frame is recorded in association with a corresponding destination group ID so as to enable searching and alteration thereof;

permitting a network administrator to input a set of destinations;

if a destination group ID corresponding to said set of destinations is found in a search of said destination routing information table, outputting said found destination group ID;

if said destination group ID corresponding to said set of destinations is not found in said search, assigning an unused destination group ID, registering said assigned destination group ID in said destination routing information table, and outputting said assigned destination group ID;

on the basis of said destination routing information table which includes said assigned destination group ID, updating said destination group ID look-up table included in each of at least one of said edge bridges which at least one is a destination of said backbone MAC frame with said destination group ID set.

8. A MAC frame transfer method as defined in claim 6, further comprising the steps of:

setting a topology information table which contains topology information indicative of a physical connection pattern of nodes comprised of all said edge bridges and backbone bridges connected with said backbone network and backbone ports interconnecting said nodes so as to enable searching and alteration;

in each edge bridge, setting a backbone port look-up table in which each destination group ID is recorded in association with at least one backbone port and information on whether each of said at least one backbone port is capable of relaying said backbone MAC frame corresponding to the destination group ID so as to enable searching and alteration thereof;

in each backbone bridge, setting a backbone port look-up table in which each destination group ID is recorded in association with at least one backbone port and information on whether each of said at least one backbone port is capable of relaying said backbone MAC frame corresponding to the destination group ID so as to enable searching and alteration thereof;

setting a backbone routing information table in which a given destination group ID is recorded in association with a set of edge bridges, backbone bridges and backbone ports witch are used for transferring a backbone MAC frame with said given destination group ID so as to enable searching and alteration thereof;

if a new destination group ID is registered in said backbone routing information table, finding, on the basis of said topology information table, at least one route through which a backbone MAC frame with said assigned destination group ID is transferred to at least one destination identified by said new destination group ID and outputting edge bridges, backbone bridges and backbone ports which are used for transferring said backbone MAC frame;

updating said backbone routing information table by registering a set of said assigned destination group ID and said output edge bridges, backbone bridges and backbone ports; and if said backbone routing information table is updated with assigned destination group ID, updating, on the basis of said updated backbone routing information table, each of said backbone port look-up tables included in at least one of edge bridges and backbone bridges which at least one constitutes a route for transferring said backbone MAC frame with said assigned destination group ID.

9. A MAC frame transfer method as defined in claim 1, further comprising the step of setting a backbone port look-up table in which each destination group ID is recorded in association with at least one backbone port and information on whether each of said at least one backbone port is capable of relaying said backbone MAC frame corresponding to the destination group ID so as to enable searching and alteration thereof, wherein said step of judging on the basis of said obtained destination group ID includes the step of searching said backbone port look-up table. capable of relaying said backbone MAC frame corresponding to the destination group ID so as to enable searching and alteration thereof, wherein said step of judging on the basis of said identified destination group ID includes the step of searching said backbone port look-up table.

10. A MAC frame transfer method as defined in claim 9, further comprising the steps of:

finding at least one route through which said backbone MAC frame should be transferred to at least one destination identified by said destination group ID on the basis of topology information which indicates, for a given destination group ID, a physical connection pattern of nodes comprised of all said edge bridges and backbone bridges connected with said backbone network and backbone ports interconnecting said nodes;

outputting edge bridges, backbone bridges and backbone ports used for transfers through said at least one route; and updating said backbone port look-up table with said output edge bridges, backbone bridges and backbone ports.

11. A MAC frame transfer method as defined in claim 1, further comprising the step of, if said step of obtaining a destination group ID fails in obtaining said destination group ID, discarding said MAC frame.

12. A MAC frame transfer method as defined in claim 1, further comprising the step of, if user data is not encapsulated in said received MAC frame, discarding said MAC frame.

13. A MAC frame transfer method as defined in claim 1, wherein said backbone MAC frame includes a destination address, and wherein said step of transferring said backbone MAC frame comprises the step of setting said destination group ID as said destination address of said backbone MAC frame.

14. A MAC frame transfer method as defined in claim 1, wherein said backbone MAC frame includes a transfer-use VLAN ID for said MAC frame, and wherein said step of transferring said backbone MAC frame comprises the step of setting said destination group ID as said transfer-use VLAN ID.

15. A MAC frame transfer method as defined in claim 1, wherein said step of transferring said backbone MAC frame comprises the step of setting said destination group ID as said service VLAN ID of said backbone MAC frame.

16. A MAC frame transfer method as defined in claim 15, further comprising the steps of:

finding at least one route through which said backbone MAC frame should be transferred to at least one destination identified by said destination group ID on the basis of topology information indicative of a physical connection pattern of nodes comprised of all said edge bridges and backbone bridges connected with said backbone network and backbone ports interconnecting said nodes, and outputting edge bridges, backbone bridges and backbone ports used for transfers through said at least one route, wherein said judging is based on said output edge bridges, backbone bridges and backbone ports in said step of judging on the basis of said identified destination group ID.

17. A MAC frame transfer method as defined in claim 1, further comprising the steps of:

receiving said backbone MAC frame from said backbone network via one of a plurality of backbone ports of one of said edge bridges;

identifying said destination group ID of said backbone MAC frame;

on the basis of said identified destination group ID, judging whether said plurality of backbone ports include at least one backbone port which is other than one that has received said backbone MAC frame and which said backbone MAC frame is to be transferred to; and if the included at least one backbone port exists, transferring said backbone MAC frame to said included at least one backbone port.

18. A MAC frame transfer method as defined in claim 17, further comprising the step of setting a backbone port look-up table in which each destination group ID is recorded in association with at least one backbone port and information on whether each of said at least one backbone port is capable of relaying said backbone MAC frame corresponding to the destination group ID so as to enable searching and alteration thereof, wherein said step of judging on the basis of said identified destination group ID includes the step of searching said backbone port look-up table by using said identified destination group ID.

19. A MAC frame transfer method as defined in claim 1, further comprising the steps of:

finding at least one route through which said backbone MAC frame should be transferred to at least one destination identified by said destination group ID on the basis of topology information indicative of a physical connection pattern of nodes comprised of all said edge bridges and backbone bridges connected with said backbone network and backbone ports interconnecting said nodes, and outputting edge bridges, backbone bridges and backbone ports used for transfers through said at least one route, wherein said judging is based on said output edge bridges, backbone bridges and backbone ports in said step of judging on the basis of said obtained destination group ID.

20. A MAC frame transfer method as defined in claim 19, further comprising the steps of:

finding at least one route through which said backbone MAC frame should be transferred to at least one destination identified by said destination group ID on the basis of topology information which indicates, for a given destination group ID, a physical connection pattern of nodes comprised of all said edge bridges and backbone bridges connected with said backbone network and backbone ports interconnecting said nodes;

outputting edge bridges, backbone bridges and backbone ports used for transfers through said at least one route; and updating said backbone port look-up table with said output edge bridges, backbone bridges and backbone ports.

21. A flooding reduction method in an edge bridge comprising at least one customer port which receives and transmits a MAC frame from and to a customer site and which has at least one service VLAN (virtual local area network) ID (identifier) preset so that a MAC frame received from one of said at least one customer port is associated with a service VLAN ID for said one of said at least one customer port; at least one backbone port for receiving and transmitting a backbone MAC frame from and to a backbone network; a destination group ID look-up table which enables a look-up of a destination group ID by using, as a key, any one or combination of a part or an entirety of header information of said MAC frame, a port which received said MAC frame and a service VLAN ID corresponding to said MAC frame; and a backbone port look-up table which enables a look-up of at least one backbone port which is to transmit or at least one backbone port which is not to transmit by using, as a key, a destination group ID for identifying a set of destinations to which said backbone MAC frame is to be transferred, wherein said backbone MAC frame at least includes said MAC frame, said service VLAN ID corresponding to said MAC frame, a source address corresponding to a source and a destination address corresponding to a destination in said backbone network, wherein if user data is encapsulated in said MAC frame received through a customer port, said MAC frame is transferred to a MAC relay portion, which either executes a first relay process in which if there exists at least one customer port other than a recipient of said MAC frame which at least one customer port corresponds to said service VLAN ID corresponding to said MAC frame, then said MAC frame is transferred to said at least one customer port and/or a second relay process in which if there exist at least one backbone port which is to transfer a backbone MAC frame which contains said MAC frame and the service VLAN ID corresponding to said MAC frame, then said MAC frame is transferred to said at least one backbone port, or otherwise discards said MAC frame, wherein if said backbone MAC frame is received from one of said at least one backbone port and if said received backbone MAC frame contains said MAC frame in which the user data is encapsulated, then said backbone MAC frame is passed to said MAC relay portion, which either executes a third relay process in which if there exists at least one customer port which corresponds to a service VLAN ID corresponding to said MAC frame, said MAC frame is transferred to said at least one customer port and/or a fourth relay process in which if there exists at least one backbone port other than a recipient of said backbone MAC frame which at least one backbone port is to transfer said backbone MAC frame, then said MAC frame is transferred to said at least one backbone port, or otherwise discards said backbone MAC frame, and wherein as a destination to which said MAC frame is transferred, any of a destination backbone port, a destination customer port, a destination edge bridge and a destination MAC address is used, the flooding reduction method comprising the steps, executed by said edge bridge, of:

if said edge bridge receives said MAC frame from one of said at least one customer port, searching said destination group ID look-up table for said destination group ID by using, as a key, any one or combination of a part or an entirety of header information of said MAC frame, the port which received said MAC frame and the service VLAN ID corresponding to said MAC frame (a destination group ID look-up step);

if said destination group ID is found in said destination group ID look-up step and said MAC relay portion transfers said MAC frame to at least one backbone port, setting said found destination group ID in a predetermined field of a backbone MAC frame which contains a service VLAN ID corresponding to said MAC frame (a destination group ID setting step);

searching said backbone port look-up table for at least one backbone port by using said found destination group ID as a key (a backbone port look-up step); and if at least one backbone port which is to transmit is found in said backbone port look-up step, enabling said backbone MAC frame to be transmitted to said at least one backbone port and, otherwise, disabling said backbone MAC frame to be transmitted to said at least one backbone port.

22. A flooding reduction method as defined in claim 21, further comprising the step of setting said destination group address as a destination address in said backbone MAC frame.

23. A flooding reduction method as defined in claim 21, wherein said backbone MAC frame includes a transfer-use VLAN ID for said MAC frame, and wherein the flooding reduction method further comprises the step of setting said destination group address as said transfer-use VLAN ID in said backbone MAC frame.

24. A flooding reduction method as defined in claim 21, further comprising the step of setting said destination group address as said service VLAN ID in said backbone MAC frame.

25. A flooding reduction method as defined in claim 21, further comprising the step of setting said destination group address as a set of said service VLAN ID and said destination address in said backbone MAC frame.

26. A flooding reduction method as defined in claim 21, used in a network comprising a combination of at least one edge bridge and an operation device which is provided with a function of enabling input and output by a network administrator and performs at least one of setting, operation, administration and monitoring of said at least one edge bridge, said operation device having a destination routing information table which enables a look-up of said destination group ID by using, as a key, a set of destinations to which said MAC frame is transferred, wherein the flooding reduction method further comprises:

a destination routing information table searching step in which, when the network administrator inputs a set of destinations, said operation device searches the destination routing information table by using the set of destinations as the key; and a destination group ID outputting step in which, if an destination group ID is found in the destination routing information table searching step, said operation device outputs the found destination group ID and, otherwise, said operation device assigns an unused destination group ID to the set of destinations, registers this combination in the destination routing information table, and outputs the destination group ID.

27. A flooding reduction method as defined in claim 26, used in a network comprising a combination of at least one edge bridge, an operation device which is provided with a function of enabling input and output by a network administrator and performs at least one of setting, operation, administration and monitoring of said at least one edge bridge, and at least one backbone bridge which each has at least one backbone port for receiving and transmitting said backbone MAC frame from and to said backbone network and which, if said backbone MAC frame is received from one of said at least one backbone port, passes said backbone MAC frame to said MAC relay portion, which executes a fifth relay process of transferring the passed backbone MAC frame to at least one backbone port other than the backbone port that has received said backbone MAC frame, wherein said operation device comprises a function of performing at least one of setting, operation, administration and monitoring of said at least one backbone bridge; a topology information table which enables a look-up of edge bridge(s) and backbone bridge(s) connected with said operation device and backbone ports at both ends of each connection by using an edge bridge or a backbone bridge as the key; a route calculator for searching said topology information table by using a plurality of destinations as the key and outputting edge bridge(s) and/or backbone bridge(s) constituting routes among the plurality of destinations and relevant backbone ports of the bridges; and a backbone routing information table which enables a look-up of a set of edge bridge(s), backbone bridge(s) and backbone ports by using said destination group ID as the key, wherein the flooding reduction method further comprises the steps, executed by said operation device, of:

if the network administrator inputs a set of destinations and if a new destination group ID corresponding to the set of destinations is assigned, passing the set of destinations to said route calculator to cause said route calculator to output edge bridge(s), backbone bridge(s) and relevant backbone ports;

registering a combination of said destination group ID corresponding to the set of destinations and the output results in said backbone routing information table; and outputting, to each of edge bridge(s) and backbone bridge(s) included in the output results, setting information of corresponding backbone ports; and wherein the flooding reduction method further comprises the step of:

if each of the edge and backbone bridges receives, from said operation device, the same setting information as output in said step of outputting setting information, said bridge updating the setting of said corresponding backbone ports according to the received setting information.

28. A flooding reduction method as defined in claim 21, used in a network comprising a combination of at least one edge bridge, an operation device which is provided with a function of enabling input and output by a network administrator and performs at least one of setting, operation, administration and monitoring of said at least one edge bridge, and at least one backbone bridge which each has at least one backbone port for receiving and transmitting said backbone MAC frame from and to said backbone network and which, if said backbone MAC frame is received from one of said at least one backbone port, passes said backbone MAC frame to said MAC relay portion, which executes a fifth relay process of transferring the passed backbone MAC frame to at least one backbone port other than the backbone port that has received said backbone MAC frame, wherein each backbone bridge has a backbone port look-up table which enables a look-up of at least one backbone port which is to transmit or at least one backbone port which is not to transmit by using said destination group ID as a key, and wherein the flooding reduction method further comprises the steps, executed by said backbone bridge, of:

in response to a reception of said backbone MAC frame from one of said at least one backbone port, extracting said destination group ID from said backbone MAC frame (=a destination group ID extracting step);

looking up a backbone port in said backbone port look-up table by using, as a key, said destination group ID extracted in said destination group ID extracting step (=a backbone port look-up step);

if at least one backbone port which is to transmit is found in said backbone port look-up step, enabling said backbone MAC frame to be transmitted to the found at least one backbone port; and if at least one backbone port which is not to transmit is found in said backbone port look-up step, disabling said backbone MAC frame to be transmitted to the found at least one backbone port.

29. An edge bridge for connecting a customer LAN (local area network) to a backbone network so that customer LAN's constitute a virtual LAN (VLAN), comprising:

at least one customer port for each communicating a MAC (media access control) frame with said customer LAN;

a destination group ID look-up table in which at least one of at least a part of header information of said MAC frame, a customer port which received said MAC frame and a service VLAN ID for said MAC frame is recorded in association with a destination group ID for identifying a combination of a source of said MAC frame and at least one destination of said MAC frame so as to enable searching and alteration thereof;

a backbone port look-up table in which each destination group ID is recorded in association with at least one backbone port and information on whether each of said at least one backbone port is capable of relaying said backbone MAC frame corresponding to said destination group ID so as to enable searching and alteration thereof;

a destination group ID look-up module, operative in case of receiving said MAC frame from one of said at least one customer port, for looking up a destination group ID in said destination group ID look-up table by using as the key at least one or any combination of at least a part of said header information of said MAC frame, a customer port which received said MAC frame and a service VLAN ID corresponding to said MAC frame;

a backbone port look-up module, responsive to a finding of said destination group ID by said destination group ID look-up module, for searching, with said destination group ID, said backbone port look-up table for one or more of said at least one backbone port which is to transfer said MAC frame;

transmission control module, operative in the event that said one or more backbone ports are found in said at least one backbone port by said backbone port look-up module which is to transfer said MAC frame module, for making said one or more backbone ports in a transmission-enable state and making remaining backbone ports in a transmission-disable state;

a MAC relay portion for identifying a service VLAN ID corresponding to said MAC frame from said customer port which received said MAC frame, forming a backbone MAC frame which at least includes said MAC frame and said service VLAN ID, and transferring said backbone MAC frame to said one or more backbone ports found by said backbone port look-up module; and a destination group ID setting module for setting said destination group ID looked up by said destination group ID look-up module to said backbone MAC frame to be transferred to said one or more backbone ports by said MAC relay portion.

30. A system for reducing the flooding, in said backbone network, of a virtual LAN realized by connecting a plurality of customer LAN's with said backbone network via respective edge bridges as each defined in claim 29.

31. A system as defined in claim 30, further comprising at least one backbone bridge which has at least two backbone ports which connect with at least two of said edge bridges and other bridges, wherein each of said at least one backbone bridge comprises:

a destination group ID extracting module for extracting said destination group ID of a backbone MAC frame received via one of said at least two backbone ports of the backbone bridge from said backbone network;

a backbone port look-up table in which each destination group ID is recorded in association with at least one backbone port and information on whether each of said at least one backbone port is capable of relaying said backbone MAC frame corresponding to said destination group ID so as to enable searching and alteration thereof;

a backbone port look-up module for searching, with said destination group ID extracted by said destination group ID extracting module, said backbone port look-up table for one or more backbone ports of said at least two backbone ports which are not a recipient of said backbone MAC frame and which said backbone MAC frame should be transferred through;

a transmission control module, operative in the event that said one or more backbone ports which said backbone MAC frame should be transferred through are found by said backbone port look-up module, for making said one or more backbone ports in a transmission-enable state and making remaining backbone ports in a transmission-disable state; and a MAC relay portion, for transferring said backbone MAC frame to said one or more backbone ports looked up by said backbone port look-up module.

32. A system as defined in claim 31, further comprising an operation device with a function of enabling an input and output by a network administrator to input, wherein said operation device comprises:

a destination routing information table in which a combination of a source of said MAC frame and at least one destination is recorded in association with said destination group ID so as to enable searching and updating thereof;

a destination routing information table look-up module for searching said destination routing information table with a set of destinations input by the network administrator;

a destination group ID registering and outputting module which, if said destination group ID for said set of destinations is found by said destination routing information table look-up module, outputs said found destination group ID and, otherwise, assigning an unused destination group ID to said set of destinations, registering said assigned destination group ID in said destination routing information table, and outputs said assigned destination group ID;

a destination group ID updating module for updating, on the basis of said destination routing information table which includes said assigned destination group ID, said destination group ID look-up table(s) included in at least one of all said edge bridges which at least one edge bridge is a destination of a backbone MAC frame with said destination group ID;

a topology information table which retains, for each destination group ID, topology information indicative of both a physical connection pattern of nodes comprised of all said edge bridges and all said backbone bridges connected with said backbone network and backbone ports interconnecting said nodes so as to enable searching and updating thereof;

a route calculator, operative in the event that said destination group ID registering and outputting module registers said unused destination group ID in said destination routing information table, for searching said topology information table for at least one route through which a backbone MAC frame with said assigned destination group ID is transferred to at least one destination identified by said assigned destination group ID and outputting edge bridges, backbone bridges and backbone ports which are used for the transfer process;

a backbone routing information table for registering a given destination group ID therein, so as to enable searching and updating, in association with a set of said edge bridges and said backbone bridges used for transferring a backbone MAC frame with said destination group ID and backbone ports of said bridges;

a backbone routing information table updating module for updating said backbone routing information table by registering said assigned destination group ID and the set of output edge bridges, backbone bridges and backbone ports; and a backbone port look-up table updating module, operative in the event that said backbone routing information table updating module updates said backbone routing information table with said assigned destination group ID, for updating, based on said updated backbone routing information table, information of each backbone port on whether the backbone port is capable of relaying a backbone MAC frame corresponding to said assigned destination group ID in each of backbone port look-up tables included in edge bridges and backbone bridges which are used as transfer routes for a backbone MAC frame with said assigned destination group ID.

33. A system for reducing the flooding, in said backbone network, of a virtual LAN realized by connecting a plurality of customer LAN's with said backbone network via respective edge bridges, each of said edge bridges comprising:

a destination group ID look-up table which enables a look-up of a destination group ID by using, as a key, any one or combination of a part or an entirety of header information of a MAC frame, a port which received said MAC frame and a service VLAN ID corresponding to said MAC frame;

a backbone port look-up table which enables a look-up of at least one backbone port which is to transmit or at least one backbone port which is not to transmit by using said destination group ID as a key;

a destination group ID look-up means, responsive to a reception of said MAC frame from a customer port, for looking up a destination group ID in said destination group ID look-up table by using as a key at least one or any combination of the header information of said MAC frame, a port which received said MAC frame and a service VLAN ID corresponding to said MAC frame;

a destination group ID setting means, operative in the event that any destination group ID is looked up and said MAC frame is transferred to one or more backbone ports by a MAC relay portion, for setting the looked-up destination group ID to a predetermined field in a backbone MAC frame which includes a service VLAN ID corresponding to said MAC frame;

a backbone port look-up means for looking up a backbone port in said backbone port look-up table by using the looked-up destination group ID as the key; and a transmission control means, operative in the event that one or more backbone ports which are to transmit are found by said backbone port look-up means, for enabling a transmission of said backbone MAC frame to the found backbone port(s) and, operative in the event that one or more backbone ports which are not to transmit are found by the backbone port look-up means, for disabling the transmission of said backbone MAC frame to the found backbone port(s).

34. A system as defined in claim 33, wherein said backbone network includes an operation device which is provided with a function of enabling an input and output by a network administrator and performs at least one of setting, operation, administration and monitoring of at least one edge bridge, wherein said operation device comprises:

a destination routing information table which enables a look-up of said destination group ID by using, as a key, a set of destinations to which said MAC frame is transferred a destination routing information table searching means, operative in the event that the network administrator inputs said set of destinations, for searching said destination routing information table by using said set of destinations as the key; and a destination group ID outputting means which, if an destination group ID is found by the destination routing information table searching means, outputs the found destination group ID and which, otherwise, assigns an unused destination group ID to said set of destinations, registers a combination of said assigned destination group ID and said set of destinations in said destination routing information table, and outputs said assigned destination group ID.

35. A system as defined in claim 34, wherein said backbone network further comprises at least one backbone bridge which each is provided with at least one backbone port for each receiving and transmitting said backbone MAC frame from and to said backbone network and which, when said backbone MAC frame is received from one of said at least one backbone port, passes said backbone MAC frame to its own MAC relay portion, which in turn performs a relay process of either transferring the passed backbone MAC frame to one or more backbone ports other than the backbone port that has received said backbone MAC frame or discarding the passed backbone MAC frame, and wherein each of said at least one backbone bridge comprises:

a backbone port look-up table which enables a look-up of at least one backbone port which is to transmit or at least one backbone port which is not to transmit by using said destination group ID as a key;

destination group ID extracting means which, when receiving a backbone MAC frame from a backbone port, extracts a destination group ID from the backbone MAC frame;

backbone port look-up means for looking up a backbone port in the backbone port look-up table by using, as the key, said destination group ID extracted by the destination group ID extracting means; and transmission control means which, if one or more backbone ports which is to transmit are found by the backbone port look-up means, enables said backbone MAC frame to be transmitted to the found one or more backbone ports and, if one or more backbone ports which is not to transmit are found by the backbone port look-up means, disables said backbone MAC frame to be transmitted to the found one or more backbone ports.

36. A system as defined in claim 35, wherein said operation device comprises:
- a function of performing at least one of setting, operation, administration and monitoring of said at least one backbone bridge;
- a topology information table which enables a look-up of edge bridge(s) and backbone bridge(s) connected with said operation device and backbone ports at both ends of each connection by using an edge bridge or a backbone bridge as the key;
- a route calculator for searching said topology information table by using a plurality of destinations as the key and outputting edge bridge(s) and/or backbone bridge(s) constituting routes among the plurality of destinations and relevant backbone ports of the bridges; and
- a backbone routing information table which enables a look-up of a set of edge bridge(s), backbone bridge(s) and backbone ports by using said destination group ID as the key, and wherein the system further comprises:
- output means, operative in the event that the network administrator inputs a set of destinations and that a new destination group ID corresponding to the set of destinations is assigned, for passing said set of destinations to said route calculator to cause said route calculator to output edge bridge(s), backbone bridge(s) and relevant backbone ports;
- backbone routing information table registering means for registering a combination of said destination group ID corresponding to said set of destinations and the output results in said backbone routing information table; and
- backbone port setting information output means for outputting, to each of edge bridge(s) and backbone bridge(s) included in the output results, setting information of corresponding backbone ports, and wherein each of said edge bridges and said at least one backbone bridges further comprises:
- backbone port setting changing means, operative in the event that each of the edge and backbone bridges receives, from said operation device, the same setting information as output by said backbone port setting information output means, changing the setting of said corresponding backbone ports according to the received setting information.

* * * * *